United States Patent
Kiefer et al.

(10) Patent No.: US 11,429,084 B2
(45) Date of Patent: Aug. 30, 2022

(54) ASSISTED ASSIGNING OF A WORKPIECE TO A MOBILE UNIT OF AN INDOOR LOCATION SYSTEM

(71) Applicant: TRUMPF Werkzeugmaschinen GmbH + Co. KG, Ditzingen (DE)

(72) Inventors: Manuel Kiefer, Sinsheim (DE); Jens Ottnad, Karlsruhe (DE); Willi Pönitz, Leonberg (DE); Ulrich Schneider, Stuttgart (DE); Benjamin Schwarz, Muenchingen (DE); Korbinian Weiss, Korntal (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 422 days.

(21) Appl. No.: 16/809,635

(22) Filed: Mar. 5, 2020

(65) Prior Publication Data
US 2020/0218235 A1 Jul. 9, 2020

Related U.S. Application Data

(63) Continuation of application No. PCT/EP2018/071164, filed on Aug. 3, 2018.

(30) Foreign Application Priority Data

Sep. 5, 2017 (DE) .......................... 102017120381.8

(51) Int. Cl.
*G05B 19/4155* (2006.01)
*G06K 19/06* (2006.01)
(Continued)

(52) U.S. Cl.
CPC ... *G05B 19/4155* (2013.01); *G06K 19/06028* (2013.01); *G06K 19/0723* (2013.01); *G06Q 50/04* (2013.01); *G05B 2219/45234* (2013.01)

(58) Field of Classification Search
CPC ...... G05B 19/4155; G05B 2219/45234; G05B 2219/31372; G05B 2219/36167;
(Continued)

(56) References Cited

U.S. PATENT DOCUMENTS

| 8,145,333 B2* | 3/2012 | Vrba | G05B 19/4188 700/99 |
| 9,037,282 B2* | 5/2015 | Reid | G05B 19/41805 700/116 |

(Continued)

FOREIGN PATENT DOCUMENTS

| DE | 4306209 A1 | 9/1994 |
| DE | 10248142 B3 | 7/2004 |

(Continued)

OTHER PUBLICATIONS

U.S. Non-Final Office Action in U.S. Appl. No. 16/809,627, dated Jan. 3, 2022, 16 pages.

(Continued)

*Primary Examiner* — Seung H Lee
(74) *Attorney, Agent, or Firm* — Fish & Richardson P.C.

(57) ABSTRACT

A method for assigning a workpiece to be processed to a mobile unit of an indoor location system used in a manufacturing hall in industrial processing of workpieces is provided. The method includes: providing a manufacturing control system for the industrial processing of workpieces with a machine tool in accordance with workpiece-specific processing plans, providing an assistance system for collecting measurement assistance workpiece data sets for the workpieces, detecting a workpiece to be assigned with the assistance system and generating a measurement-assistance-workpiece data set for the workpiece, comparing the measurement-assistance-workpiece data set with a processing plan-assistance-workpiece data set corresponding to the workpiece to identify a processing plan, providing a mobile (Continued)

unit assigned to the identified processing plan, the indoor location system configured to determine a position of the mobile unit, and spatially assigning the workpiece to the mobile unit assigned to the identified processing plan.

18 Claims, 6 Drawing Sheets

(51) Int. Cl.
　　　　*G06K 19/07*　　　(2006.01)
　　　　*G06Q 50/04*　　　(2012.01)
(58) Field of Classification Search
　　　　CPC ...... G05B 2219/40543; G05B 19/4183; G06K 19/06028; G06K 19/0723; G06Q 50/04; G06Q 10/08; G01S 13/76; G01S 1/0428; G01S 5/021; Y02P 90/02; Y02P 90/30
　　　　See application file for complete search history.

(56) References Cited

U.S. PATENT DOCUMENTS

| | | |
|---|---|---|
| 2003/0150908 A1 | 8/2003 | Pokorny et al. |
| 2006/0092033 A1 | 5/2006 | Hoff et al. |
| 2007/0293952 A1 | 12/2007 | Callaghan et al. |
| 2011/0045763 A1 | 2/2011 | Mohanty et al. |
| 2013/0233922 A1 | 9/2013 | Schoening et al. |
| 2014/0095119 A1 | 4/2014 | Chang et al. |
| 2014/0240125 A1 | 8/2014 | Burch et al. |
| 2015/0119077 A1 | 4/2015 | Buchheim et al. |
| 2015/0253766 A1 | 9/2015 | Pettersson et al. |
| 2015/0356332 A1 | 12/2015 | Turner et al. |
| 2016/0100289 A1 | 4/2016 | Mayorchik et al. |
| 2016/0363663 A1 | 12/2016 | Mindell et al. |
| 2017/0017223 A1 | 1/2017 | Skaggs et al. |
| 2017/0039516 A1 | 2/2017 | Amaon et al. |
| 2017/0039517 A1 | 2/2017 | Amann et al. |
| 2017/0064667 A1 | 3/2017 | Mycek et al. |
| 2017/0075346 A1 | 3/2017 | Oya et al. |
| 2017/0308067 A1* | 10/2017 | Lamparter ......... G05B 19/4187 |
| 2018/0052452 A1 | 2/2018 | Kimura et al. |
| 2018/0099643 A1 | 4/2018 | Golsch et al. |
| 2018/0239010 A1 | 8/2018 | Mindell et al. |
| 2018/0246497 A1 | 8/2018 | Wolf et al. |
| 2019/0049929 A1 | 2/2019 | Good et al. |
| 2019/0240703 A1 | 8/2019 | Kiefer et al. |
| 2019/0243343 A1 | 8/2019 | Kiefer et al. |
| 2020/0208989 A1 | 7/2020 | Ottnad et al. |
| 2020/0218237 A1 | 7/2020 | Ottnad et al. |
| 2021/0044935 A1 | 2/2021 | Ottnad et al. |

FOREIGN PATENT DOCUMENTS

| | | |
|---|---|---|
| DE | 102005 037567 | 5/2006 |
| DE | 102010041548 A1 | 3/2012 |
| DE | 102011054360 A1 | 4/2013 |
| DE | 202016106352 U1 | 12/2016 |
| DE | 102016120131 A1 | 4/2018 |
| DE | 102016120132 A1 | 4/2018 |
| DE | 102016220015 A1 | 4/2018 |
| DE | 102017107357 A1 | 4/2018 |
| DE | 102017120382 B3 | 10/2018 |
| DE | 102017120378 A1 | 3/2019 |
| DE | 102017120381 A1 | 3/2019 |
| DE | 102017120383 A1 | 3/2019 |
| EP | 2138920 A2 | 12/2009 |
| EP | 2963953 A1 | 1/2016 |
| EP | 3118702 A1 | 1/2017 |
| GB | 2513956 A | 11/2014 |
| JP | 2002-108431 | 4/2002 |
| JP | 2005-190120 | 7/2005 |
| JP | 2007-095006 | 4/2007 |
| JP | 2012-218037 | 11/2012 |
| WO | WO 2011/033504 A1 | 3/2011 |
| WO | WO 2012/167301 A1 | 5/2012 |
| WO | WO 2013/053569 A1 | 4/2013 |
| WO | WO 2018/069314 A1 | 4/2018 |
| WO | WO 2019/048152 A1 | 3/2019 |
| WO | WO 2019/048153 A1 | 3/2019 |

OTHER PUBLICATIONS

DE Office Action in German Appln. No. 10 2018 110 145, dated Jan. 25, 2019, 6 pages (English translation).
IEEE Standards Association. ""IEEE Standard for Local and Metropolitan Area Networks-Part 15.4: Low-Rate Wireless Personal Area Networks (LR-WPANs),"" IEEE Standards Association Computer Society, Sep. 5, 2011, 802.15. Apr. 2006, 314, pages.
JP Japanese Office Action in Japanese Appln. No. 2020-512608, dated Nov. 29, 2021, 10 pages (with English translation).
PCT International Preliminary Report on Patentability in International Appln. No. PCT/EP2019/059873, dated Oct. 27, 2020, 17 pages (with English translation).
PCT International Search Report in International Appln. No. PCT/EP2019/059873, dated Jun. 25, 2019, 18 pages (with English translation).
U.S. Non-Final Office Action in U.S. Appl. No. 17/078,186, dated Jan. 20, 2022, 18 pages.
U.S. Non-Final Office Action in U.S. Appl. No. 16/809,650, dated Mar. 31, 2022, 28 pages.
DE Office Action in German Appln. No. 102017120381.8, dated Jul. 5, 2018, 6 pages.
DE Office Action in German Appln. No. 102017120382.6, dated May 2, 2018, 3 pages.
DE Office Action in German Appln. No. 102018110150.3, dated Jan. 24, 2019, 4 pages.
Kritz et al., "Improving Indoor Localization Using Bluetooth Low Energy Beacons," Mobile Information Systems, 2016, 11 pages.
Omni-ID, "Omni-ID ® View 3 & View 4," 2016, 2 pages.
Omni-ID, "Omni-ID ® Power 60," 2016, 2 pages.
PCT International Search Report and Written Opinion in International Appln. No. PCT/EP2018/071163, dated Nov. 12, 2018, 24 pages (with English translation).
PCT International Search Report and Written Opinion in International Appln. No. PCT/EP2018/071164, dated Nov. 12, 2018, 25 pages (with English translation).
PCT International Search Report and Written Opinion in International Appln. No. PCT/EP2018/072863, dated Jan. 2, 2019, 21 pages (with English translation).
Ramakrishnan et al., "Feasibility and Efficacy of BLE Beacon IoT Devixes in Inventory Management at the Shop Floor," International Journal of Electrical & Computer Engineering, Oct. 2016, 6(5):2362-2368.
Swedberg, "Omni-ID's View 10 Tag Aims to Replace Paperwork at Detroit Diesel, Other Factories," RFID Journal, 2014, 3 pages.
Zhong et al., "A two-level advanced production planning and scheduling model for RFID-enabled ubiquitous manufacturing," Advanced Engineering Informatics, Oct. 2015, 29(4):799-812.
Zhong et al., "RFID-enabled real-time manufacturing execution system for mass-customization production," Robotics and Computer-Integrated Manufacturing, Apr. 2013, 29(2):283-292.
PCT International Preliminary Report on Patentability in International Appln. No. PCT/EP2018/072863, dated Mar. 10, 2020, 16 pages (with English translation).
Zuehlke, "SmartFactory—Towards a factory-of-things," Annual Reviews in Control, Apr. 1, 2010, 1(34):129-138.

\* cited by examiner

ASSISTED ASSIGNING OF A WORKPIECE TO A MOBILE UNIT OF AN INDOOR LOCATION SYSTEM

CROSS REFERENCE TO RELATED APPLICATIONS

This application is a continuation of and claims priority under 35 U.S.C. § 120 from PCT Application No. PCT/EP2018/071164, filed on Aug. 3, 2018, which claims priority from German Application No. 10 2017 120 381.8, filed on Sep. 5, 2017. The entire contents of each of these priority applications are incorporated herein by reference.

TECHNICAL FIELD

The present disclosure relates to a method for monitoring and controlling manufacturing processes, in particular process courses in the industrial manufacturing of workpieces in steel and/or sheet metal processing. Moreover, the present disclosure relates to a system for workpiece position monitoring in manufacturing halls of the metal processing industry, in particular in steel and/or sheet metal processing. Furthermore, the present disclosure relates to the assignment of workpieces to process courses within the framework of manufacturing control.

BACKGROUND

Representative for the metal processing industry, many parts of different sizes are often fed to various processing steps in industrial steel and/or sheet metal processing. For example, workpieces on machine tools, such as laser cut materials or punched sheet metal parts, are sorted and fed to further processing steps. After the processing, cut or punched workpieces are often made available to the respective downstream production step in a group. The various process courses are usually performed manually based on a visual comparison with paper-based documents. However, if many different partial shapes are cut, a wide variety of processing steps are carried out, and different areas in a manufacturing hall for steel and/or sheet metal processing are approached, such that monitor and control processes become complex and error-prone. For example, a high diversity of parts can cause errors in part assignment and subsequent processing steps, e.g., when putting down parts in designated workpiece collection point units in line with a specific order or when transporting parts to the subsequent processing step. If, for example, parts are put down incorrectly, a subsequent processing step can be negatively affected, e.g., incorrectly performed.

For example, a physical material flow is usually manually synchronized with processing steps to be carried out in a discrete manner at booking stations, so that often no detailed or only a delayed evaluation can take place.

For example, from the (not yet published) German patent applications DE 10 2016 120 132.4 ("Werkstücksammelstelleneinheit und Verfahren zur Unterstützung der Bearbeitung von Werkstücken") and DE 10 2016 120 131.6 ("Absortierunterstützungsverfahren und Flachbettwerkzeugmaschine") with a filing date of Oct. 21, 2016, methods to support the sorting process of workpieces produced with a flatbed machine tool, generally methods to support the processing of workpieces, are known. Furthermore, a supporting method for the sorting of e.g., cut material of a flatbed machine tool is known from the German patent application DE 10 2017 107 357.4 "Absortierunterstützungsverfahren und Flachbettwerkzeugmaschine" with a filing date of Apr. 5, 2017. The above-mentioned German patent applications are incorporated herein in their entirety.

From US 2016/0100289 A1, a localization and tracking system for determining the positions of mobile wireless devices is known, for example, using "ultra-wideband" (UWB) technology, whereby the positions of the devices are obtained by calculating arrival time differences, for example. Motion sensors based on UWB technology, which can be extended with acceleration sensors, among other things, are disclosed according to US 2015/0356332 A1, for example, for performance analysis in sports.

SUMMARY

One aspect of the present disclosure is based on the objective of proposing methods and systems that can intelligently support manufacturing processes, especially in the field of steel and/or sheet metal processing—generally metal processing.

At least one of these objectives is solved by a method for assigning a workpiece to be processed to a mobile unit of an indoor location system according to one or more implementations of the present disclosure, by a manufacturing control system according to one or more implementations of the present disclosure, by a method for industrial manufacturing of an end product according to one or more implementations of the present disclosure, and the use of an indoor location system according to one or more implementations of the present disclosure. In one aspect, a method for assigning a workpiece to be processed to a mobile unit of an indoor location system, which is used in a manufacturing hall in the industrial processing of workpieces, in particular in steel and/or sheet metal processing, includes the following steps:

providing of a manufacturing control system for the industrial processing of workpieces with a machine tool according to workpiece-specific processing plans, order information being defined respectively in the processing plans, the order information including processing parameters, workpiece parameters, and at least one processing plan-assistance-workpiece data set;

providing at least one mobile unit that is assigned to a processing plan and the position of which can be determined with the indoor location system of the manufacturing control system, providing an assistance system adapted to acquire measurement-assistance-workpiece data sets for workpieces, detecting a workpiece to be assigned with the assistance system and generating a measurement-assistance-workpiece data set for the workpiece to be assigned, comparing the measurement-assistance-workpiece data set with the processing plan-assistance-workpiece data set to identify a processing plan associated with the detected workpiece to be assigned, and spatially assigning the detected workpiece to be assigned to the mobile unit, which is assigned to the identified processing plan.

In a further aspect, a manufacturing control system for controlling manufacturing processes in a manufacturing hall in the industrial manufacturing of workpieces to be assigned, in particular in steel and/or sheet metal processing, in a manufacturing hall, includes an indoor location system for supporting the manufacturing control of the manufacturing processes with multiple transceiver units permanently installed in the manufacturing hall, at least one mobile unit (or mobile device), and an analysis unit (or analyzer), wherein the transceiver units and the at least one mobile unit are configured for transmitting and receiving electromagnetic signals, and the analysis unit is configured for determining runtimes of the electromagnetic signals between the transceiver units and the at least one mobile unit and for determining the position of the at least one mobile unit in the manufacturing hall from the runtimes of the electromagnetic signals, and therein the indoor location system is configured to exchange and provide data on the position of at least one mobile unit in the manufacturing hall as part of the manufacturing control system. The manufacturing control system is further configured to perform the above method.

In a further aspect, a method for industrial manufacturing of an end product by using a manufacturing control system (herein also referred to as MES (manufacturing execution system)) includes the following steps:

receiving a manufacturing order for manufacturing the end product from a workpiece with an MES of the manufacturing control system, the MES being implemented in a data processing device, selecting individual processing steps with the MES, determining a sequence of processing steps with the MES, wherein the processing steps include individual or multiple of the following operations: cutting, in particular laser cutting, punching, bending, drilling, threading, grinding, joining, welding, riveting, screwing, pressing, treating the edges and surfaces;

data-technical assigning the processing steps to a machine or a workstation unit, data-technical assigning the manufacturing order to a mobile unit data set in the MES, manufacturing a workpiece for the end product, whereby it is machined, in particular to a part of the end product, after a first of the processing steps on the machine or workstation unit assigned to the processing step, spatially assigning of the mobile unit assigned to the manufacturing order to the manufactured workpiece according to the above described method, storing a status change of the manufacturing order in the MES, transport of the manufactured workpiece together with the mobile unit according to the manufacturing order to the next machine or workstation unit in the predetermined sequence, performing the processing step on this machine or workstation unit, storing a status change of the manufacturing order in the MES, and performing the processing steps of the manufacturing order with the MES, whereby the position of the mobile unit can be determined with the location system based on electromagnetic signals at any time by the MES, and the MES has data on the current status and current position of the workpiece at any time.

Another aspect relates to the usage of a manufacturing control system of an industrial production plant with an indoor location system for assignment of one of the mobile units to at least one workpiece in a metal processing, in particular steel and/or sheet metal processing, industrial manufacturing plant, determination of the position of at least one workpiece by localizing the associated mobile unit with the indoor location system, integration of the indoor location system into the manufacturing control system for the industrial processing of workpieces with a machine tool according to workpiece-specific processing plans, in the processing plans, there is defined order information including processing parameters, workpiece parameters, and at least one processing plan-assistance-workpiece data set, usage of an assistance system for detecting measurement-assistance-workpiece data sets for workpieces, comparing the measurement-assistance-workpiece data set with the processing plan-assistance-workpiece data sets to identify a processing plan that belongs to the detected workpiece to be assigned, and for spatially assigning the detected workpiece to be assigned to the mobile unit, which is assigned to the identified processing plan.

In some embodiments, a processing plan assistance workpiece data set can include an image data set of the workpiece to be assigned, and/or a coding data record such as an RFID (radio-frequency identification) data set or bar coding data set or a coding data set of a magnetic coding incorporated into the workpiece to be assigned. The assistance system can be configured for detecting image data of workpieces to be assigned for generating an image data set for a workpiece to be assigned, and/or for detecting a coding for generating a coding data set for a workpiece to be assigned. The assistance system can in particular be configured to acquire a measurement-assistance-workpiece data set for a workpiece to be assigned, which is grasped by an operator. Furthermore, the assistance system can be arranged on a machine tool and can be configured to detect measurement-assistance-workpiece data sets for workpieces output from the machine tool and intended for further processing.

In some embodiments, the machine tool can be configured to receive the workpiece to be assigned and to deposit the workpiece in a depositing area assigned to the mobile unit. In particular, the machine tool can be configured to receive the mobile unit and/or the workpiece to be assigned and to deposit it at a workpiece collection point, in particular on a carriage or a pallet.

In some embodiments, the assistance system for assisting a sorting process of workpieces arranged spatially adjacent to each other on a sorting table can include a camera for imaging the sorting table and for generating the measurement-assistance-workpiece data set for at least one of the workpieces from a plurality of sorting-image data sets, and the processing plan-assistance-workpiece data set is a processing plan-image data set on which there is based the manufacturing of the workpieces arranged spatially adjacent to each other. For example, the workpieces to be assigned can be generated with a flatbed machine tool, in particular a laser cutting or punching flatbed machine tool, according to processing plans and can be fed to the sorting table. The assistance system can generally have access to the processing plan-assistance-workpiece data sets of the manufacturing control and perform the comparison.

In some embodiments, the manufacturing control system can provide a workpiece parameter to the mobile unit, the workpiece parameter being intended to output information about the workpiece assigned to the mobile unit to support manual operation of spatial assignment.

The manufacturing control system can further control the mobile unit in such a way that at least one processing parameter and/or workpiece parameter is shown on a display unit (or display).

In some embodiments, the method further includes a mobile unit data-assignment process, wherein in the manufacturing control system a mobile unit data set of the at least one mobile unit is assigned to the processing plan. The mobile unit data-assignment process can include:

a positioning and/or shaking of the mobile unit in a geometrically defined zone in the manufacturing hall, an interacting with the manufacturing control system via a user interface, an input of a reference number belonging to the processing plan into the manufacturing control system, an automated or partially automated activation of the mobile unit via sensors of the mobile unit including an input key on the mobile unit, an acceleration sensor, a position sensor, and/or a sound sensor, and/or a linking of the mobile unit data set with a default object in the manufacturing control system.

Furthermore, the mobile unit data-assignment process can at least part of order information onto the mobile unit.

The method can further be used for assigning at least one tool to be assigned or a workpiece collection point unit to a mobile unit of the indoor location system based on comparing a measurement-assistance-tool data set with processing plan-assistance-tool data sets.

Multiple workpieces, in particular those which have the same shape in the end state and have passed through the same processing steps, and especially those which also belong to a common order, are called workpiece collection units or workpiece group. These are usually put down at a workpiece collection point unit. It is advantageous to assign a mobile unit to each workpiece collection unit, especially both physically (by placing the mobile unit close to a workpiece collection point unit, e.g., on the workpiece collection unit) and organizationally (by digitally assigning a mobile unit data set to a processing plan in the manufacturing control system). A list of all orders (including processing plans) can be stored in the manufacturing control system. Each of the orders can be assigned to a workpiece collection unit. When additionally an assignment of orders to respectively one mobile unit is done, then each order can be located within the manufacturing hall at any time. Within the manufacturing control system, this can further be combined with reported information of work places and/or machines.

The indoor localization and the indoor location system are featured by the fact that the determination of the position of the mobile units can be done solely by the analysis unit, i.e., without manual interaction. Previous systems for localizing workpieces or orders in manufacturing plants have the disadvantage that lost workpieces or orders must be searched for manually. It has been recognized that these manual searches, especially in manufacturing plants with a high number of small and constantly changing orders, e.g., in contract manufacturing plants, account for an enormously high proportion of non-productive time. With the localizing in line with the present disclosure and the system described, the positions of the workpieces and thus of the orders can be called up on a screen, filtered, or specifically located, for example. The need for time-consuming manual searches of workpieces, but also of tools or persons, can thus be drastically reduced, especially in (steel and/or sheet metal processing) industrial manufacturing.

Further advantages of aspects disclosed herein relate to the facilitated integration of an indoor localization into manufacturing processes.

In some embodiments, the processing of the workpiece or workpieces is controlled or monitored at workstations that are part of a network with or are integrated into the manufacturing control. Such machine workstations include machines that receive manufacturing instructions, in particular in a digital manner, via a data link and execute the manufacturing instructions. No or only minimal intervention by the operator is possible. Such machines are usually referred to as automated or fully automated machines. Such machines can also report the status of the manufacturing to a manufacturing control.

In some embodiments, the machining of the workpiece or workpieces is controlled and/or monitored at workstations that form a network with the manufacturing control system only to a very small degree or not at all or are not integrated into the manufacturing control. These may be workstations where the processing steps are carried out manually by human hand or workplaces, which may have machines but which are networked only to a very small degree or not at all or which can be networked only in a complicated manner, e.g., so-called manual workstations as described in DE 10 2016 220 015.1, "Handarbeitsplatzeinheit, Arbeits-Datenverarbeitungsvorrichtung, Handarbeitsplatzbetreibungssystem, Handarbeitsplatzbetriebsverfahren and Handarbeitsplatzbereitstellungsverfahren" with a filing date of Oct. 13, 2016. This mentioned German patent application is also incorporated in its entirety herein.

Workstations that are only networked to a very small degree can be manual workstations with simple machines, such as workstations for drilling, sawing, milling, and bending. Their only network connection can be a monitoring system as described in DE 10 2016 220 015.1. Another possibility to connect to a network is the monitoring of the power consumption of such machines and the networking of the information from the power consumption. For example, if a machine has not consumed any power at all, it can be concluded that the machine cannot have processed the order yet.

In particular, the combination of manufacturing processes with workstations, which are networked with or integrated into the manufacturing control, and those workstations, which are not, or only to a very limited extent, represent an important obstacle to effective and efficient manufacturing control still today, because orders are still printed on paper when they are transferred from an automated workstation to a non-automated workstation. This slows down manufacturing. This also makes flexibility more difficult if, for example, an order that is to be processed particularly quickly with multiple processing steps is to be processed at multiple workstations within a short time. A manufacturing company that can ensure this smoothly has advantages over its competitors who cannot. With the localization of the workpieces and the linking of the localization with the manufacturing control system, the concepts disclosed herein can enable a flexible and fast manufacturing of end products.

Based on the concepts disclosed herein, intelligent assistance systems in manufacturing halls can use 2D or 3D position determination of workpieces (generally material) and optionally persons (e.g., operators), transport media, machines, tools, and much more to support manufacturing processes. This makes it possible to use 2D or 3D positions as information in the context of a holistic manufacturing control and digitization of factories, where the information may be available in addition to further sensor information and was determined according to the concepts disclosed herein.

The concepts disclosed herein are based on the use of a 2D/3D indoor positioning system as a starting point for location-based information processing. The location system can optionally be equipped with further sensor technology, for example with acceleration and/or orientation sensors, and thus also serve as a starting point for orientation-dependent information processing. This enables in particular a location (and if necessary orientation) dependent interaction within the 2D/3D indoor location system during manufacturing control as well as an optimization of production processes. For example, virtual barriers (gates) and zones can be used to automatically monitor and control a manufacturing process and subsequent production steps. This can be done in particular in real time.

It was recognized that the use of such location systems is possible when considering the expected processes in a manufacturing hall also in the special environment of a steal and/or sheet metal processing industrial manufacturing. Accordingly, such location systems can be integrated into a manufacturing execution system (also referred to herein as MES (Manufacturing Execution System). By taking into account the expected process courses in a manufacturing hall, the use of such location systems becomes possible, for example, despite the presence of steel and sheet metal, although metallic workpieces may reflect and shield the electromagnetic signals used. It can also be used if the metallic workpieces are additionally moved locally and the position and orientation of the reflecting surfaces are constantly changing.

With reference to the above-mentioned registering of physical material flow and processing steps, when using the 2D/3D indoor location systems a complexity is generated in the low-expenditure, dynamic assignment of acquired position information to physical components. The concepts disclosed herein address this complexity and allow, for example, to assign a mobile unit to production orders with assigned identifiers without complex interaction, wherein one gains the position information to be assigned with the mobile unit.

Indoor location systems allow the detailed mapping of material flows in manufacturing within a manufacturing hall into digital processing of a process. Location systems simplify the localization of objects/persons, which participate at the manufacturing, in the production environment. If tools, operating resources, or load carriers are initially once equipped with a mobile unit of the location system, they are manually or automatically assigned according to digital information within the digital control system. This also applies to objects that are temporarily involved in the manufacturing, such as production orders or service personnel. Temporarily required dynamic assignments can be created again and again and are only needed for a few hours, days, or weeks in the manufacturing hall. In order to enable and ensure the dynamic assignment of mobile units to new production orders with little effort and reliably, the process aids suggested herein can be used.

This applies in particular to the use of optical sensors for the simple assignment of, for example, production orders to mobile units of the location system. This enables a close interlocking of the assignment process and the manufacturing process, which ensures process reliability, especially in a still predominantly manual environment of manufacturing.

The embodiments disclosed herein for the integration of such a indoor location technology into the processes of sheet manufacturing may include inter alia the following method steps, uses, and advantages:
- mapping of the changing association of orders.
- mapping of an assistance for a person, e.g., an operator, with the help of the location system and other sensor technology, especially for the localization of workpieces and tools.
- ensuring a process-safe and low-cost manufacturing through automated procedures with low degrees of freedom for the operator.

intuitive course of manufacturing without time-consuming information collection for the operator.

With the methods disclosed herein, indoor position determination can be carried out with an accuracy of less than 30 cm, in particular less than 10 cm, in a manufacturing hall not accessible by GPS (Global Positioning System) satellite signals with a floor plan in the range of e.g., 1 ha. This accuracy is essentially not possible with other technologies (Bluetooth, WiFi, WLAN, infrared, mobile radio, RFID). When locating workpieces, orders, persons (e.g., operators), and/or tools, many requirements must be taken into account. It was recognized that the industrial manufacturing is increasingly directed towards the manufacturing of small series with many separate processing steps (manufacturing processes such as cutting, bending, grinding, surface treatment) at different workstations such as machine workstations and manual workstations. Often multiple hundred different orders have to be completed in one day, all of which require different processing steps.

As soon as only one malfunction occurs, the manufacturing control can quickly become very confusing. Spending a lot of time, half or not yet processed orders are searched in the manufacturing hall by individual persons and their status is determined. This is then transmitted to the manufacturing control. This can lead to a considerable loss of time during the actual manufacturing.

Due to the ever-faster processing steps in productive processing and with the increase in the number of different orders with ever smaller numbers of identical parts, such failures can occur more and more frequently. The resulting time losses reduce productive time. If orders, workpieces, persons, e.g., operators, and tools are to be found quickly, the localization of at least some of these units, as disclosed herein, is helpful in reducing missing time. In particular, it meets the very high requirements for industrial manufacturing.

In industrial manufacturing, the aim is a localization in real time. Such a localization should be precise enough in terms of location so that mobile units can be reliably located and/or assigned to the processing steps. For this purpose, it has turned out that a localization that is only accurate to 1 m is not sufficient. Also, a location system that would have to be recalibrated whenever the radiation behavior of electromagnetic waves changes, caused for example by the movement of metallic workpieces in the manufacturing hall, is disadvantageous and often not applicable. The localization should also be flexible, it should be possible to combine multiple orders into one order, an order should be dividable into multiple orders, etc. The localization should be easy to use. The localization should be failproof.

In general, the concepts disclosed herein can enable an increase in process reliability, an optimization of throughput times and correspondingly a cost optimization of production. Specifically, the concepts disclosed herein may result in sometimes considerable time savings in the manufacturing process, whereby the manufacturing process extends, for example, from the creation of a required number of parts to the correct transfer to a subsequent process (e.g., a subsequent metal processing step). Furthermore, multiple orders can be worked on simultaneously and with process reliability. The concepts disclosed herein also allow for easy assignment of workpieces within the location system. In this way, open orders can be optimized despite the complexity of multiple orders to be processed simultaneously.

Furthermore, flexible processing of different process courses with the accompanying time savings can be achieved if machines such as laser cutting machines and/or punching machines are integrated into the semi-automated manufacturing process. In addition, error prevention and the automatic, correct recording of workpieces, processing steps, etc. can provide the basis for data-based real-time control of metal processing (e.g., steel and sheet metal manufacturing). Accordingly, machine tools used for the creation of small batches of workpieces can also be integrated into a manufacturing process controlled by an MES within the framework of Industry 4.0.

DESCRIPTION OF DRAWINGS

Herein, concepts are disclosed that allow at least partly to improve aspects of the prior art. In particular additional features and their usefulness result from the following description of embodiments on the basis of the drawings. The drawings show.

DETAILED DESCRIPTION

Figure 1:
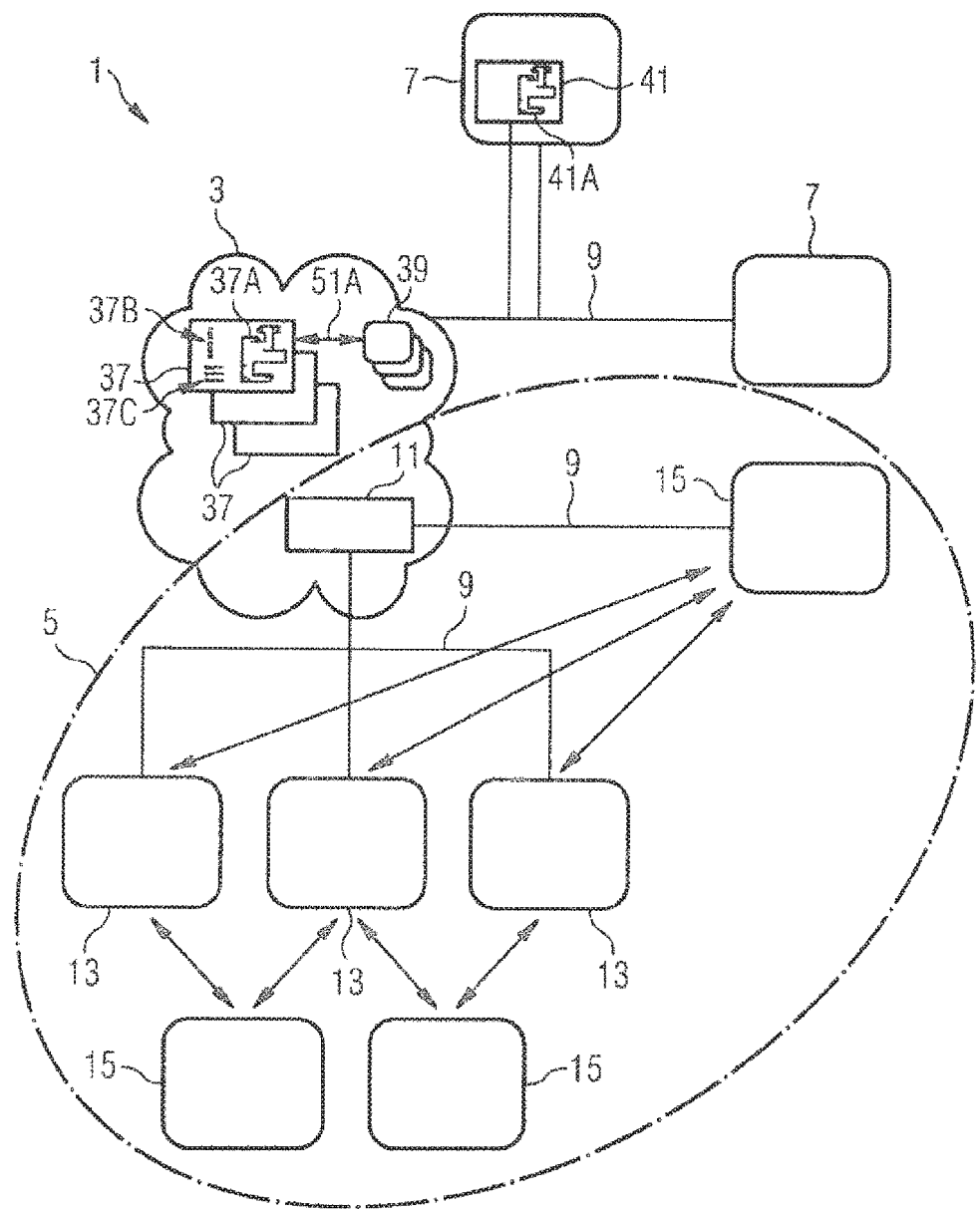
FIG. 1 shows an exemplary schematic representation of a manufacturing control system with an indoor location system.

Aspects described herein are partly based on the realization that with the accuracy and reliability of new location systems based in particular on UWB-technology, for example with an accuracy in location determination of less than 30 cm, in particular less than 10 cm, the use of indoor location systems in industrial manufacturing becomes reasonably possible.

The location systems disclosed herein, which are intended for integration into industrial manufacturing, are based on mobile units (herein also referred to as "tags") and stationary transceivers (herein also referred to as "Ankers" or "anchors"). In the case of integration into industrial manufacturing, in order to determine the position of a workpiece, generally an object ("assets"), the same is equipped with at least one mobile unit or related to it functionally or spatially (hereinafter also referred to as physical or spatial assignment). The mobile units are generally electronic components capable of communicating with the transceiver equipment, in particular via UWB communication technology. Each mobile unit can have its own time measurement unit ("clock") for determining runtimes.

Spatial assignment can be carried out by positioning a mobile unit close to an assigned workpiece or on the workpiece itself, or by depositing the workpiece on a workpiece collection point unit on which a mobile unit is provided, for example a transport carriage, a collection container, or a pallet. The mobile unit can be permanently attached there (or to a person) or can be attachable to or be placed on the workpiece/workpiece collection point unit. For attaching, the mobile unit may, for example, have a holding mechanism, such as a magnet or a clamping, screwing, clipping, bayonet or suction device, with which it can be connected to the workpiece or to the workpiece collection point unit in such a way that it cannot detach from the latter in an uncontrolled manner.

In addition to the spatial assignment of, for example, a workpiece to the mobile unit, an assignment of the mobile unit (and thus of the spatially assigned workpiece) to the respective manufacturing order of the workpiece can also be made (also referred to herein as digital assignment of the manufacturing process or processing plan assignment for short).

Fully or partially automated assignment of a processing plan connect, for example, a production order with a specific mobile unit of the location system. They can be carried out, for example, by a combined use of an assistance system in the operator's environment and the location system.

An example of an assistance system is an optical assistance system in which optical sensors are used to recognize workpieces or tools grasped by the operator and, in the context of the available production data from the production orders, to (preferably) unambiguously identify them for the processing plan assignment. An exemplary assistance system is disclosed in the above-mentioned DE 10 2016 120 131.6. Such assistance systems can also be used for spatial assignment, for example, when image data relates to the workpiece and the mobile units.

In addition, one or more sensors provided on the mobile unit can be used for the processing plan assignment, but also for the spatial assignment, as explained below in connection with embodiments of the mobile unit.

The spatial assignment can then support further tracking of the recognized and assigned workpiece via the localizable mobile unit during the subsequent manufacturing process. In the following and in connection with the figures described below, various physical (spatial) and digital (process) assignments are explained exemplarily. These can be used individually or in combination. The close interlocking of the process flow ensures process reliability in the manual environment.

For the digital assignment, the mobile units can be linked to production orders. The production orders relate to processing processes at various manufacturing stations, for example at a laser cutting machine or a punching machine as well as, for example, at a picking station. A mobile unit can now be used to track a production order. The digital assignment can be done, for example, by placing a mobile unit in a geometrically defined zone. When the mobile unit is present in the zone, it is linked to one of the production orders not yet assigned. Thereby, information on this order can be loaded initially onto the mobile unit or, if required, it can always be newly loaded.

The digitally assigned mobile units can, for example, be distributed by the operator on workpiece collection points such as carriages or pallets, generally load carriers, on which the workpieces may be put during production, possibly with camera support (physical assignment). Tools can also be digitally assigned to a mobile unit. Within the scope of a machine-based digital and/or physical assignment, mobile units can be positioned on the load carriers by the machines in the production process if the production stations are sufficiently automated.

During the physical assignment, the operator or, if necessary, a correspondingly controllable machine can automatically place the workpieces to be assigned on the load carrier next to the mobile unit, which may already be digitally assigned. The physical assignment is completed, for example, manually with a confirmation directly at the mobile unit or via the MES.

Furthermore, the physical assignment can be supported by an assistance system that tracks the manual handling process. If an operator picks up a workpiece or tool, this pick-up can be detected via sensors by the assistance system. The assignment by the assistance system to an already digitally assigned mobile unit can be done in two ways, for example. On the one side, the operator can visually assign the real workpiece/tool to a schematic sketch that is displayed on a display unit of the mobile unit. On the other side, by registering the successful grip of a workpiece/tool, the correspondingly assigned mobile unit can emit an optical or acoustic signal, for example.

As an alternative to the preceding digital assignment, the assistance system can arrange for a mobile unit in whose vicinity a workpiece/tool is placed to be digitally assigned according to the type of workpiece/tool detected by the assistance system.

As an alternative or in addition to the camera-based assistance system, dynamic assignment can be carried out, for example, by scanning order papers and/or a code (e.g., barcode, QR code, etc.) of the mobile unit. Furthermore, a common or two separate images can be evaluated with the code of the order papers and the code of the mobile unit. In some assignment procedures, an image of the order papers can be taken with a camera on the mobile unit (or a separate camera of the operator), possibly in addition to an optical assistance system.

As an alternative or in addition to processing the information on order papers, the nominal geometry of the workpiece can be used. After a comparison of the geometry of the workpiece, for example, recorded with the assistance system based on the camera or the camera on the mobile unit, with the target geometry, information can then be reloaded from the central production data system and be shown to the operator. If the image processing does not allow a unambiguous identification, the operator can be given a list of the active production orders that are suitable for the geometry being acquired. The operator then makes the final selection and establishes the digital assignment.

In this way, process reliability can be improved. In particular, workpieces/tools that appear similar can be assigned uniquely as objects without being confused, incorrectly assigned and erroneously processed by the user.

FIG. 1 schematically shows a manufacturing control system 1, which comprises an MES (Manufacturing Execution System) 3 and an indoor location system 5 (herein briefly referred to as location system).

The MES 3 is connected to one or more machine tools 7 positioned in a manufacturing hall via wireless or wired communication links 9. In general, the MES 3 is used to control process courses/manufacturing steps in the industrial manufacturing of workpieces with the machine tools 7. It thus serves in particular to control the machine tools 7. For this purpose, the MES 3 receives information about the process courses/manufacturing steps as well as status information of the machine tools 7. The MES 3 represents a data processing system or, in general, a data processing method that can be implemented in a data processing device. This can be a single electronic data processing device (server) or a group of multiple data processing devices (server group/cloud). The data processing device or the group can be provided locally in the manufacturing plant or it can be set up external in a decentral manner.

A platform on which the data processing devices can be made available—i.e., on which the MES 3 can be implemented, can be a so-called cloud. The cloud includes, for example, an external server with computing and storage capacity that can be used simultaneously by multiple product manufacturers. Access authentication, passwords, etc. can be used to ensure that no manufacturer can access the data of another manufacturer or the operator of the manufacturing plant. It can be ensured that no external third party can access the stored data. The protection against unwanted access can be guaranteed by the data stored in the cloud being also processed there and the manufacturer or operator of the manufacturing plant who wants to use the data in turn processes the data only in the cloud. Such cloud usage can lead to a significant simplification of system configurations and an associated cost saving.

The data processing device may have a graphical user interface (GUI=Graphical User Interface) with various application programs (APPs). By providing different APPs that can run a specific application program, the manufacturing software that a company needs can be set up in segments so that—depending on need—it only has to be accessed when it should be used, such as when using a specific APP. This allows the provider who provides the manufacturing software to be remunerated depending on the respective need.

The location system 5 can have multiple transceiver units 13 and at least one mobile unit 15. The location system 5 can also interact with the MES 3. For example, an analysis unit 11 of the location system 5 can be configured as part of the MES 3.

The transceiver units 13 can be configured to send UWB radio signals to the mobile units 15 and receive UWB radio signals from them.

The distance between a spatially mobile unit 15 and a fixed transceiver unit 13, for example, can be determined by the time it takes for the signal to travel the distance between the two units. If the distances of multiple transceiver units 13 whose location is known in each case are determined, the spatial location of the mobile unit 15 in relation to the transceiver units 13 can be determined, for example, by triangulation.

For a determination of the runtime, the transceiver unit 13 and the mobile unit(s) 15 can have highly accurate clocks that can determine the time to a few or even only fractions of ns. Even if the clocks in the transceiver unit 13 and in the mobile unit 15 are highly accurate, the clocks are not necessarily synchronized yet. Different methods of synchronizing clocks or eliminating errors following from the asynchronous clock operation can be used. For example, one of the transceiver units 13, e.g., a master position determination unit, can send a signal at a first time T1 and a second signal at a second time T2. The mobile unit 15 can know the time difference T2−T1 or it can be transmitted together with the signals so that it can synchronize to the time of the transceiver units 13. Alternatively, the mobile unit 15 can send two signals at a previously known time interval Ta. In this case, the transceiver unit can use its own time measurement with its own clock from the reception of the first signal to the reception of the second signal to determine the synchronization deviation and remove it from the distance measurement. The time interval between the first signal and the second signal should be short, so that the mobile unit has not moved significantly during this time. The time interval can be selected by the mobile unit to be a predetermined multiple or fraction of the time that the mobile unit requires from the reception of a signal to which it is to respond until the output of the first signal.

The transceiver units 13 can also be connected to the analysis unit 11 via wireless or wired communication links. For example, mobile units 15 can only communicate via the transceiver units 13. Alternatively or additionally, they can independently communicate with the analysis unit 11/the MES 3 via further communication connections 9 (e.g., a WLAN connection).

In general, the data communication of the transceiver units 13 and the mobile units 15 with the manufacturing control system 1, especially with the MES 3, can be bidirectional.

In some embodiments, WLAN transmission stations can be integrated into transceiver units 13 of the location system 5 for data access into the manufacturing control system 1, so that digital data can be accessed via the transceiver units 13 within the manufacturing hall by mobile means, e.g., via smartphones or tablets. The integration of the WLAN transmitting stations in the transceiver units 13 can simplify the installation and operation of a data communication system in the manufacturing hall.

For example, the analysis unit 11 may serve as a central master position determination unit (also referred to herein as "Server"). For example, this defines a communication framework for UWB communication. The communication frame contains among other things the transmission time of the frame/the UWB radio signals. In some embodiments, one of the transceiver units 13 can be designed as a master position determination unit.

In an exemplary embodiment of indoor localization, the master position determination unit transmits the communication frame for a position detection of one of the mobile units 15 to the transceiver units 13. This communication frame is used for the signal exchange of the localizing between the mobile units 15 and the transceiver units. The position of the stationary transceiver units 13 with respect to the master position determination unit is known to the transceiver units 13, for example, by querying a central database, so that the transceiver units 13 and the analysis unit 11 know the time offset between transmission and reception of the UWB radio signal over the signal runtime.

After a predetermined time interval, e.g., 100 ms, the master position determination unit transmits a second communication frame which is received by the transceiver units 13 and the mobile units 15. By recording the time from the beginning of the reception of the first frame to the beginning of the reception of the second frame, the transceiver units 13 and the mobile units 15 know what the master position determination unit understands, for example, exactly under 100 ms. The mobile units 15 and the transceiver units 13 can thus synchronize the frequency of their time determination units with the master position determination unit.

After different, previously configured time intervals (measured from the reception of the second frame) the mobile units 15 send a response frame. For example, a "tag 1" transmits after 10 ms, a "tag 2" after 20 ms, a "tag 3" after 30 ms, etc. This radio transmission is received by the transceiver units 13 and the exact time of reception with respect to the start of transmission of the second frame of the master position determination unit is transmitted to the analysis unit 11. The analysis unit 11 then determines the position of the mobile units 15, e.g., using trilateration methods, and passes this information on to the MES 3.

A group of transceiver units 13 can be assigned to a master position determination unit and the reception time points can be transmitted to the same. For the acquisition of positions in large manufacturing halls or across multiple buildings or rooms, multiple groups of transceiver units 13 can be provided, each assigned to its own master position determination unit. These master position determination units can in turn communicate with each other. Depending on the position of the mobile unit 15, the transmission of the reception time points to different master position determination units (servers) and the execution of trilateration can be performed with these different master position determination units.

Using the exemplary analysis of runtimes and trilateration described above, the indoor location system 5 can detect the position of one or more mobile units 15 via the transceiver units 13 using UWB technology. The UWB technology uses frequency ranges from e.g., 3 GHz to 5 GHz, whereas the UWB technology uses a relatively large frequency range for the formation of temporally sharply defined signal characteristics (communication frames). In order to locate an object that emits radio waves as precisely as possible, a signal with very steep edges is required. This means that the signal represents a rectangular signal curve over time rather than a sinusoidal curve. This requires a signal in which multiple sinusoidal signals with different frequencies are superimposed. This is because a signal can be formed from multiple sinusoidal signals with different frequencies, the signal having a steep edge and being approximated to an essentially rectangular shape over time. This means that multiple frequencies from a broadband frequency spectrum must be available to form a signal. Accordingly, UWB technology, which has a broadband frequency spectrum, is particularly suitable for exact localization. The technology and the usable frequency bands of UWB technology are described, for example, in the standard "IEEE 802.15-2015".

Figure 2:
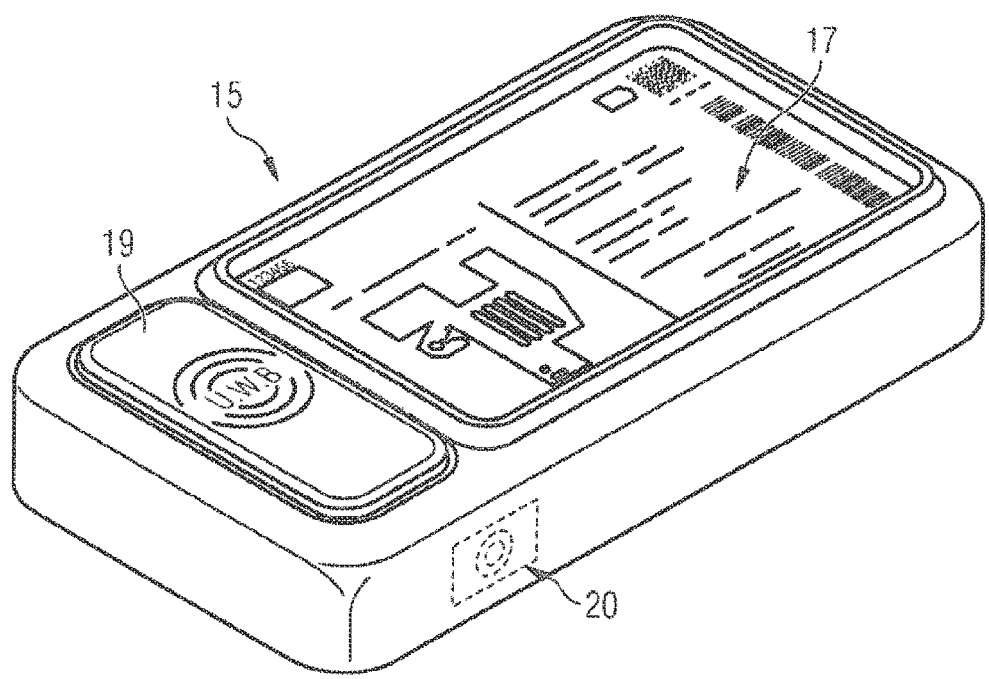
FIG. 2 shows a representation of an exemplary embodiment of a UWB-based mobile unit.

FIG. 2 shows an example of a mobile unit 15. For an interacting of an operator with a mobile unit 15, the mobile unit 15 may have an electronically controlled display 17, for example an E-Ink display (also known as an electronic paper display), and/or one or more signal emitting devices 18 (e.g., light-emitting diodes-LEDs) for outputting information. This can be, for example: type of the current and the next processing step, for example "laser cutting", "deburring", or "bending"; name and/or identification of the order; date, e.g., the date of the completion or the start of the order; number of the parts to be processed; name or identification of the customer or client.

On the display 17, for example, information on the order, readable for man and/or machine, can be displayed coded and/or in written form and/or as a figure. The display 17 can also be used as a signal emitting device for feedback to the user who moves (e.g., shakes) or operates (e.g., presses a button 19) the mobile unit 15 in one of the described ways.

Another example of a signal output device is a device for outputting sound, especially in the audible range, especially for outputting speech information.

In general, the mobile unit 15 can have as a signal output device a modulatable signal source for generating modulated light, sound or vibration signals. It can then—similar to the communication device described in the German utility model publication DE 20 2016 106 352 U1—be used as a data sending communication device for wireless data transmission. With the aid of such a communication device, especially a camera-free one, a suitably supplemented mobile unit can, for example, transmit access data in conjunction with an electronic signal processing unit. Thereby, the communication device may have at least one sensor for receiving light, sound, or vibration signals and the signal processing unit may be programmed to recover from received modulated signals the data contained therein.

Furthermore, at least one signal input device (e.g., a key 19 shown in FIG. 2) for entering parameters can be integrated into the mobile unit 15.

The mobile unit 15 can also have a simple sensor as signal input device for receiving light, sound, or vibration signals, in particular a brightness sensor. It can then be used as a data receiving communication device, as described for example in the aforementioned DE 20 2016 106 352 U1, for wireless transmission of data, in particular access data, of a machine tool. For this purpose, the machine tool has at least one modulatable signal source for generating light, sound, or vibration signals that have been modulated according to the data to be transmitted. For example, in some embodiments, it is possible to use those features of the machine tool which the machine tool has for machining the workpieces anyway and which have the ability to generate sound, vibration, or modulated light variations, which can be used to transmit data to the mobile unit 15.

In some embodiments, the mobile unit 15 may have a transmitter and/or receiver for data transmission by electromagnetic induction and be designed to perform data processing according to a predefined protocol (e.g., using RFID, NFC: near field communication). This can be achieved with particularly cost-effective hardware components that can also be designed to save energy. In general, near field communication using NFC or RFID is a robust, fast, and wireless communication in the near field.

The automated or assisted assignment can be made intuitive and process safe by additional sensors provided in the mobile unit. However, the exemplary sensors described below can also be profitably used in other manufacturing context.

For example, one can provided gyroscopes, acceleration sensors, orientation sensors, vibration sensors, and/or magnetic sensors for the earth's magnetic field. Other MEMS (micro-electro-mechanical system) based sensors can also be integrated additionally or alternatively.

Such sensors can provide a more robust and accurate position determination by sensor fusion with the position data of the location system. In addition, a sensor (or multiple together) can form the basis for an interaction with a person, e.g., an operator, who, for example, causes gestures ("writing in the air") or targeted vibrations. This can be done depending on location and context. A particular gesture in a first zone can then trigger a different action than in another zone.

The evaluation of the mobile unit's sensors is particularly targeted and meaningful when they are placed in the context of the production environment. Partial groups are formed in the storage area; and during welding, assembly, joining: multiple sensors are combined together. They can also be used for quality control and marking of rejects.

Vibration sensors can be used to identify interaction with the operator and to identify vibration profiles (documentation of the production environment for specific components) to optimize the production environment. They can also be used to detect earthquakes.

The mobile unit 15 may also include a camera 20, which is configured to acquire images of workpieces and/or codes (e.g., bar codes or QR codes) on the workpieces or on other documents, tools or products. In this way, workpieces and/or orders can be assigned to the mobile unit 15. In addition, the mobile unit can have a functionality for determining, processing, and transmitting the camera data.

In some embodiments, the mobile unit 15 can have a sensor (weighing cell) for determining a weight of a workpiece and/or a workpiece collection point and/or a filling level of a workpiece collection point. In addition, it can have a functionality for processing and transmitting the correspondingly determined data. Furthermore, the level of a workpiece collection point can be monitored, for example, by magnetic induction, electrical capacitance, ultrasound, or camera-based or a combination of these technologies.

The mobile unit 15 may also have a sensor for determining a magnetic field strength. In addition, it can have a functionality for processing and transmitting the data thus obtained. Such a magnetic field sensor can be used to read out a magnetic coding which is, for example, incorporated in a workpiece. In general, such sensors can serve as a basis for a unique identification of sheet metal components through the specific structure of metals. An example of such a sensor is a Hall sensor. Generally, such sensors can be designed for eddy current measurements. Corresponding methods for coding and reading out such a coding are disclosed in DE 102 48 142 B3 or in DE 43 06 209 A1, for example.

In some embodiments, the mobile unit 15 may have a sensor and/or transmitter for receiving and/or transmitting data via an infrared (IR) interface. In addition, it may have a functionality for processing and transmitting such IR data. IR interfaces (IR diode, IR LED, bluetooth low energy) as communication interfaces are inexpensive and can be used in a very power-saving manner.

The mobile unit 15 can also have a temperature sensor together with a functionality for determining, processing, and transmitting temperature data. As the manufacturing control knows the location of the mobile unit 15, the manufacturing control with the temperature data can be used to regulate the room temperature in the manufacturing hall. The manufacturing control system can record the temperature, especially in any area of the manufacturing hall in which a mobile unit with a temperature sensor is located, and display it graphically, for example, or evaluate it for error states. For example, unusual development of coldness can be detected when doors are open or an alarm can be given in the event of unusual development of heat. Similarly, the mobile units can form a decentralized network of humidity sensors to control the humidity in the manufacturing hall and/or of brightness sensors to control the illumination of the manufacturing hall. In addition to using the mobile unit as a sensor for controlling a building, such temperature sensors and humidity sensors can provide documentation of the manufacturing conditions for a specific workpiece or generally for the operation of the manufacturing plant.

In some embodiments, the mobile unit 15 can additionally have a GPS sensor together with a functionality for determining, processing, and/or transmitting GPS data.

The mobile unit 15 may also include a gas sensor, in particular a smoke detector, together with a functionality for determining, processing and/or transmitting data for gas analysis. As smoke detectors, the mobile units thus form a decentralized early warning system in the event of fire or a machine defect.

In some embodiments, the mobile unit 15 can have a sensor for the recognition of biological data, especially person-specific data such as fingerprints or facial recognition data. The mobile unit 15 or the manufacturing control can thus recognize individual persons. This allows, for example, to set the display of mobile unit 15 to a language assigned to the person (for example, the person's native language).

Furthermore, certain information can only be given to certain persons, for example, depending on an activity profile assigned to the person.

The mobile unit 15 can also have a sensor for detecting the vital functions of a person, e.g., an operator, in the vicinity. For example, data regarding pulse/heartbeat, muscle contraction/expansion, blood pressure can be recorded. The data allow monitoring the physical condition of the person and can provide conclusions about his or her activity. The mobile unit 15 accordingly has the functionality to determine, process, and/or transmit data recognized in this way. Accordingly, the mobile unit, which is carried by a person, can monitor its condition.

In some embodiments, the mobile unit 15 may have a sensor for detecting audio signals together with the functionality for detecting, processing, and/or transmitting data detected in this way. The mobile unit can be controlled by voice input, and audio data can be recorded, stored, evaluated, and forwarded to other mobile units The sensors and functions described above on mobile unit 15 can be activated or deactivated by the manufacturing control, for example. The activation of individual functionalities can be time-controlled as an option by the operator or marketer of the manufacturing control in the form of a special licensing procedure. If, for example, an operator of a manufacturing plant wishes specific functions only for a certain time, e.g., temperature monitoring only when his production facility is not in operation, he can have this functionality enabled for a period of time specified by him in accordance with the licensing procedure. For example, the licensing procedure may be more favorable for him than if he uses the functionality without interruption. For the operator or marketer of the manufacturing control system, this may have the added benefit of getting to know better the functionalities actually used by his customers.

Usually the electronics of the mobile unit 15 are operated with a battery or rechargeable battery. A battery can be charged by means of contacts led to the outside or contactless, e.g., inductive charging. Both can be done in such a way that the mobile unit 15 has a tightly enclosing housing to protect it from moisture and environmental influences. The mobile unit 15 may also have a device for charging the batteries that extracts energy from environmental influences, e.g., the so-called "energy harvesting" from temperature differences between the top and bottom of the unit, from rapid movements such as vibrations or shocks, or from existing electromagnetic waves (e.g., solar).

To ensure that the battery or accumulator is operated economically, the mobile unit 15 can enter a standby mode in which it no longer sends an UWB signal and/or deactivates reception, for example. In some embodiments, it can leave the stand-by mode independently. For example, if it has been moved, it can transmit a new location to the manufacturing control.

In general, individual or multiple of the described sensors can be used individually or in combination for such control methods. The sensors for orientation and acceleration detection are particularly suitable for controlling such changes in operating mode.

In some embodiments, the mobile unit 15 may have a housing made of one of the following materials or a combination of them: plastic, metal, and rubber. The housing may also have a resilient material such as rubber on its corners and/or edges to protect against damage. The latter can also be used to protect against slipping, e.g., during transport.

The sensors described above provide machine-readable information that is displayed to the operator in a process-safe manner. The display unit of the mobile unit can be used as information interface. Alternatively, a display of a manufacturing plant or a display specifically provided for in the manufacturing hall can be used. The data displayed on the display unit of the mobile unit cannot always completely map the entire information content of a workpiece, but it can display context-based data necessary for the corresponding manufacturing process, for example the next manufacturing process for logistics, part geometry for picking, component tolerances for quality inspection. Display parameters such as size, color, movement, and flashing are suitable means of emphasizing and supporting information being important at that time.

Furthermore, an LED on the mobile unit can be provided as an exposed element of the human-readable information, which can visually communicate coded information to the human by means of different colors, blinking frequencies, or blinking patterns. A flashing LED in particular is easier to recognize at large distances than, for example, a display 17, which is why a signaling device such as an LED has particular advantages when, for example, a mobile unit 15 is being sought. It can be addressed remotely by an operator and then be made noticeable by a signaling device. Additionally or alternatively, it can emit a sound signal. Such remote-controlled addressing can, for example, be carried out by another mobile unit or by another device, especially a portable device, e.g., smartphone, tablet, or by the analysis unit 11. However, it can also be done directly, e.g., via near-field transmitters (e.g., Bluetooth, NFC, IR).

In the context of an industrial manufacturing of workpieces in steel and/or sheet metal processing, the mobile units 15 are usually assigned to workpieces. Optionally, the mobile units 15 can be carried by persons in the manufacturing or they can be attached to auxiliary equipment such as transport carriages, machines, and tools, which also allows the mobile unit 15 to be spatially or digitally) assigned to a person, e.g., a worker, or to an auxiliary equipment in order to support and/or record processes. The digital assignment relates to person-specific or resource-specific information.

Figure 3:
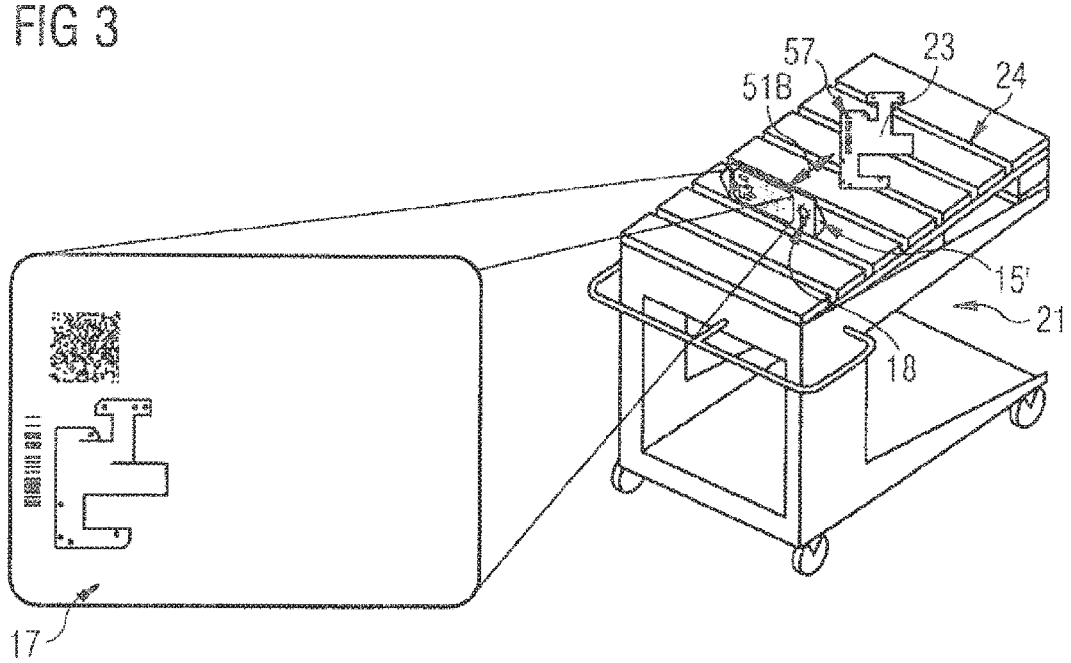
FIG. 3 shows a representation of a further exemplary mobile unit on a transport carriage for workpieces.

For example, FIG. 3 shows a transport carriage 21 with a workpiece 23 and a mobile unit 15'. The transport carriage 21 includes a storage area 24 for this or multiple such workpieces 23, which were generated by a machine tool within the framework of a processing plan. The mobile unit 15', for example, shows information specific to these workpieces 23 on the display 17, which can be received on the basis of the digital assignment.

The mobile unit 15' is configured accordingly, e.g., to receive information from the MES 3 about the deposited workpieces 23 and to output it for an operator. For example, the mobile unit 15' is configured, for example, to receive information about the number of stored workpieces 23, workpieces still missing, a subsequent processing step, an underlying order (customer), target material, etc. and to output it on the display 17. The display 17 can be an E-Ink display to save energy.

Furthermore, a signal or feedback can be given by activating a signal emitting device, for example one or more LEDs or an acoustic signal source. In general, such signal delivery devices are designed to give feedback signals to an operator.

The mobile unit 15' may also have (supplementary) signal input devices. For example, a vibration sensor (for example an acceleration sensor) and/or an orientation sensor can be provided as a signal input device.

Such mobile units, especially in the form of such combined signal, display, and localizing units, can be used as independent units in the process flow during manufacture. They can be spatially assigned to one or more workpieces 23 and then be moved by an operator together with the assigned workpieces 23 from processing step to processing step/from machine tool 7 to machine tool 7.

Such a mobile unit may also be integrated, in particular in the form of such combined signaling units, displaying units, and locating units, in a transport carriage, a pallet or, more generally, a mobile workpiece collection unit. Together with these, it can be used as an independent unit in the course of process during manufacture. This unit can then be spatially assigned to one or more workpieces 23 (e.g., by positioning the same on it) and then be used by an operator to move the assigned workpieces 23 from processing step to processing step/machine tool 7 to machine tool 7.

The provision of mobile units in manufacture can be used in many ways. Exemplary use scenarios are outlined below.

The mobile units are located via the transceiver units 13 using runtime analysis. The transceiver units 13 are usually fixed to the hall ceiling, hall walls, machine tools 7, storage structures etc. The positions of the transceiver units 13, for example, are stored in a digital site plan of the manufacturing hall.

Figure 4:
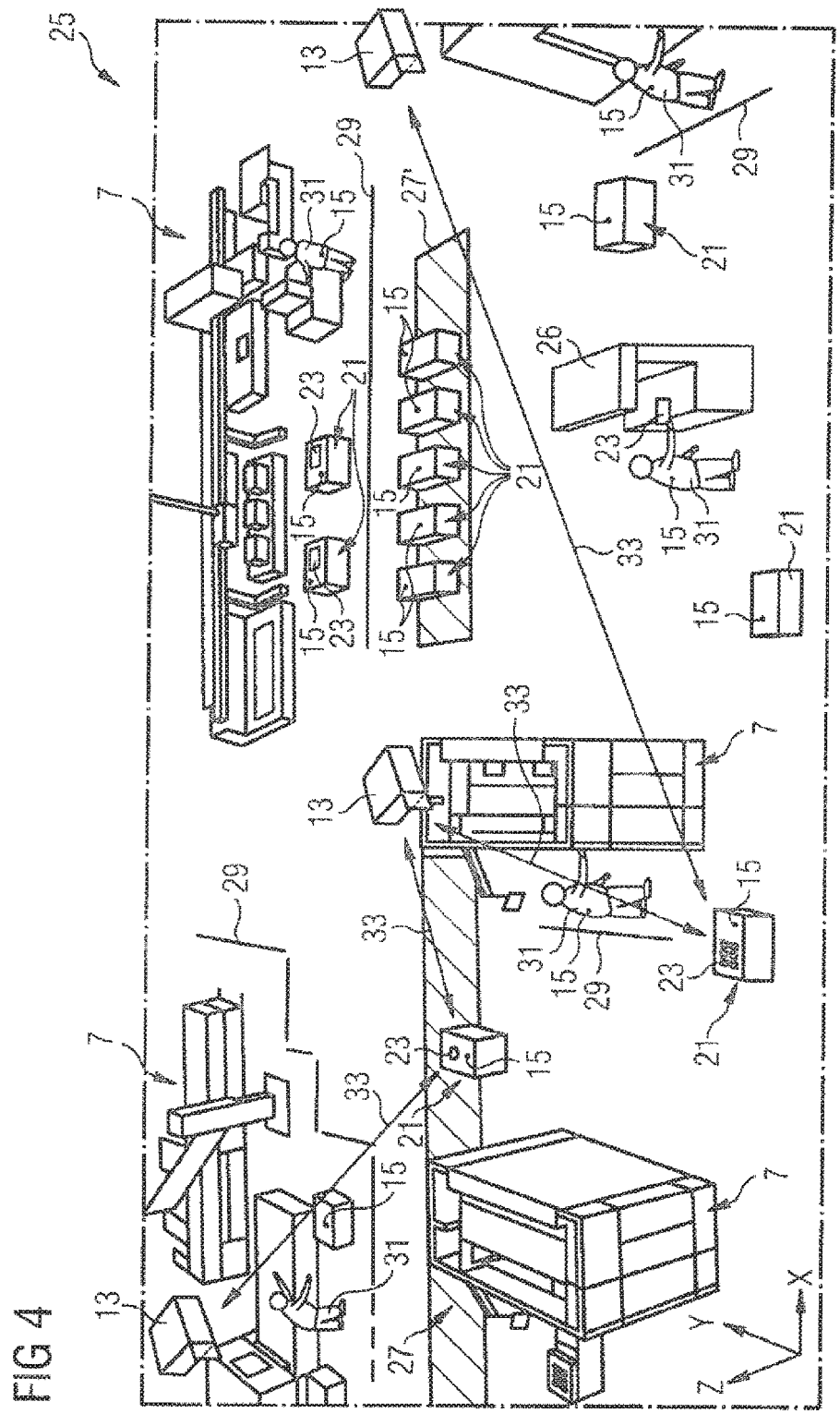
FIG. 4 shows an exemplary digital site plan of a manufacturing hall.

FIG. 4 shows a schematic digital site plan 25 of an exemplary manufacturing hall equipped with multiple machine tools 7 of different types. Examples of machine tools 7 in steel and metal processing, are cutting machines, especially laser cutting machines, punching machines, grinding machines, bending machines, etc. The site plan 25 also shows a workstation 26 which is networked to a very low degree, such as a manual workstation with simple machines, e.g., for drilling, sawing, milling, bending, which are not part of a network or only part of the network via a monitoring system, as described in DE 10 2016 220 015.1, for example. The map also shows zones 27, 27' and gates 29. The zones 27, 27' and the gates 29 have been defined by an operator with regard to the use of machine tools 7 and associated work processes. The gates 29 extend spatially (e.g., linearly) in the manufacturing hall and define limits, the crossing of which by a mobile unit can trigger specific actions. The zones 27, 27' and the gates 29 can generally be assigned workpiece-specific or object/operator-specific properties.

A view as illustrated in FIG. 4 can be shown schematically on a screen (monitor) of a data processing device (e.g., PC). Status information can be displayed when individual zones, gates or mobile units are activated on the monitor (e.g., using a cursor or, in the case of touch pads, a touch). One can filter for specific mobile units, e.g., all mobile units with assignment to orders of a specific customer). The temperature distribution measured with temperature sensors of the mobile units can be displayed. The status of machines can be displayed, etc.

Thereby, actions can be triggered by using spatial assignment in the manufacturing control system if a mobile unit is located within a specific zone or crosses a specific gate, whereby these actions can vary depending on the respective workpiece/object, and its processing/processing status, generally due to the digital assignment. The zones 27, 27' and the gates 29 can also be marked in color in the manufacturing hall on site.

Furthermore, the site plan 25 schematically shows workpiece collection points, for example transport carriages 21 or partial areas of the same, which are located near a machine tool 7 or in one of the zones 27, for example. Furthermore, one can recognize schematically operators 31, who operate the machine tools 7.

In the digital site plan 25, therefore, not only stationary elements (machine tools) but due to the spatial and digital assignment of the mobile units also moving elements (workpieces, transport carriages, operators) are displayed. The integration of moving elements into the site plan is made possible by the indoor localization, for example by assigning respectively own mobile units to the transport carriages 21 and operators 31

Furthermore, exemplary positions of multiple transceiver units 13 can be seen in the digital site plan 25. The positions are selected in such a way that at least 2 (2D localization) or 3 and more (3D localization) transceiver units 13 are assigned to a corresponding area in the manufacturing hall to be covered by the indoor localization. As an example, runtime measurements for moving elements (or the assigned mobile units 15) are illustrated by double arrows 33 in FIG. 4.

The primary application of the indoor location system 5 is the localization of workpieces 23, generally material, as well as mobile units used in manufacturing such as transport carriages 21, forklifts, tools, and other mobile devices. The fact that these objects can be more easily located during manufacturing with the respectively assigned mobile unit 15 using the position information of the mobile units, their spatial assignment, and digital assignment, which essentially only relates to the mobile unit and the type of assigned object, reduces or avoids search times. The obtained spatial information about the objects additionally allows an analysis of process courses and of the utilization of e.g., tools.

The localization can be done in 2D or 3D. If, for example, a 3D site plan of the manufacturing hall is available (as shown in FIG. 4), a vertical localization can be performed in addition to the primary horizontal localization. Thus, in addition to the coordinates x and y in the horizontal plane, the height coordinate z must also be taken into account. 3D localization places specific demands on the transceiver units 13, which cover the area on which the 3D positioning is based, and on their positions in the manufacturing hall.

Figure 5:
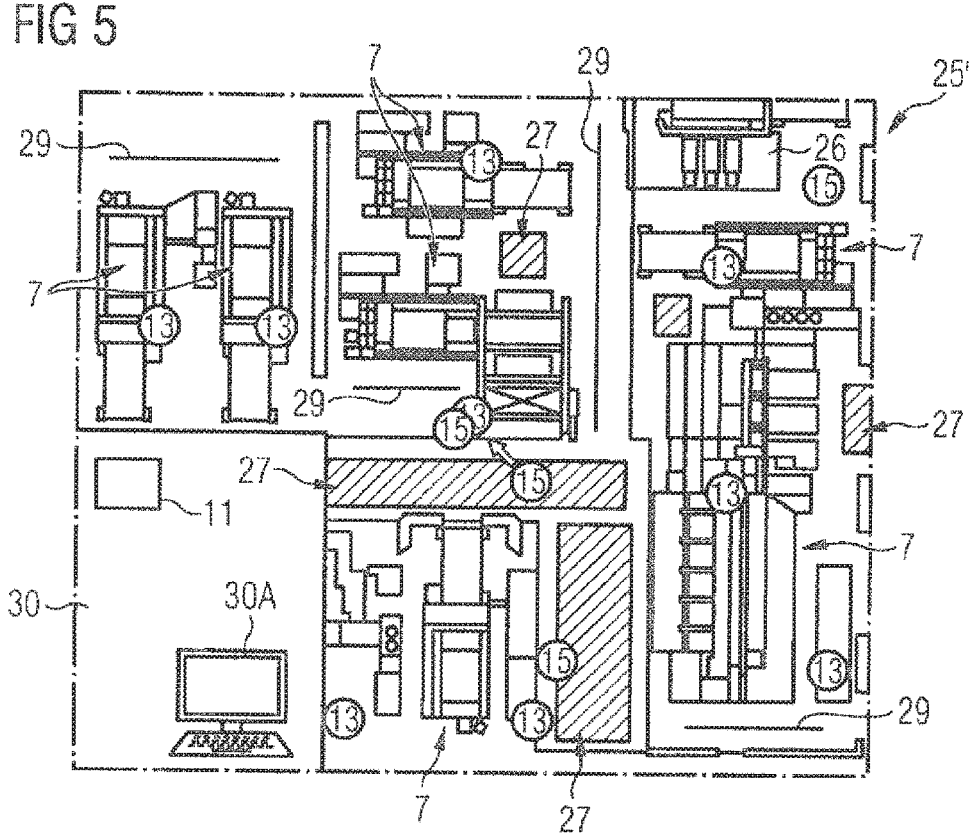
FIG. 5 shows another exemplary digital site plan.

FIG. 5 shows a view of another digital site plan 25' of another exemplary manufacturing hall. One can see multiple positions of transmitter-receiver units 13 (anchors) and multiple current positions of mobile units (tags) 15. Further, one can see multiple zones 27 and gates 29.

Using the location system, the positions of mobile units 15 in the site plan 25' and their position in relation to zones 27 and gates 29 can be displayed for control purposes when processing workpieces. This in turn requires that a mobile unit 15 is assigned to a workpiece (or a group of workpieces), or an operator, a means of transport, a tool, etc. In a control area 30, the position of a manufacturing control device of manufacturing control system 1 is indicated. The analysis unit 11 can be positioned here. At that place, there may also be a data processing device 30A (e.g., PC) with a screen (monitor) on which, for example, the digital site plan 25 or 25' illustrated in FIG. 4 or FIG. 5 is displayed. In particular, the digital assignment of a mobile unit to a workpiece (or an object used in manufacturing such as a tool) can be done by various interactions with the manufacturing control system 1 (hereinafter also briefly referred to as manufacturing control). For example, in a user interface of the manufacturing control system, which is provided on a smartphone or tablet, the respective workpiece/respective object can be selected and assigned to the specific mobile unit by entering, for example, a respective reference number.

Alternatively, after selecting a workpiece/object in the user interface, the mobile unit can be assigned with the manufacturing control by activating an enter key on the mobile unit (see e.g., key 19 in FIG. 2) and the assigned data exchange of the mobile unit.

Instead of a manual input, for example, the mobile unit can alternatively be activated automatically or semi-automatically by a predetermined movement for activation, e.g., shaking, tapping, or vibrating it. Such a predetermined movement can be detected, for example, by an acceleration sensor additionally provided in the mobile unit. Furthermore, a semi-automated assignment can be carried out by manually identifying a specific mobile unit (e.g., by shaking the mobile unit) at a specific position (e.g., a defined zone 27). Here, the manufacturing control can assign the specific position of the e.g., shaking to workpieces to be specifically processed. For example, the manufacturing control can also conclude that a mobile unit is linked to a default object (e.g., an empty carriage) when the mobile unit is shaken at a defined assignment area (e.g., zone 27' in FIG. 4).

Furthermore, by means of image processing, for example, an image of the mobile unit, which is provided with an identification such as a barcode (see display in FIG. 2), and the assigned workpiece/object can be assigned.

Furthermore, a graphical assignment can be made via a dialog displayed on the user interface.

Depending on the application, active or inactive mobile units can be used in the location system. Active mobile units permanently communicate their position to the manufacturing control system cyclically at a desired repetition rate. In general, active, repeatedly (periodically) emitting transmitters are also called "beacons". In contrast, an inactive mobile unit temporarily does not participate in a localization process. This may be the case, for example, if the last presumed position of the mobile unit is known, the assigned workpiece is stored for a longer period of time, order processing is suspended, or longer idle times between processing operations are to be expected.

Sensors provided in the mobile unit such as an acceleration sensor, a position sensor, or a sound sensor can be used to monitor such conditions. In general, a change from the inactive to the active state can be triggered by (digital) signals or manual manipulation. Manual manipulation can be carried out, for example, by deliberately shaking the mobile unit (e.g., manual shaking) or by starting to transport the workpiece (transfer through a gate 29). For active mobile units, repetition rates can be defined specifically for each mobile unit. With sets of rules, reasonable behavior patterns can be defined for each mobile unit or the assigned workpiece or object according to the context information. Context information can include, for example, a zone affiliation, recently passed spatial gates, an active processing operation, a current time window (day/night/weekday), and a specific tag family.

In a usage scenario, a person, for example an operator, should bend work pieces 23 according to an order. To do this, the operator accesses data from the manufacturing control system (MES; production management system) and opens, for example, the digital site plan 25, 25' of the manufacturing hall. If the workpieces were provided with a mobile unit 15 (workpiece tag), the operator sees the location of the workpieces 23 to be bent based on an assigned mobile unit 15 in the site plan 25, 25'. For example, the mobile unit 15 and the workpieces 23 were placed on a transport carriage 21 and the mobile unit 15 was assigned to the workpieces 23 as well as to the transport carriage 21. Accordingly, the symbol transport carriage can be displayed in the site plan, e.g., together with a schematic shape of the workpiece.

Figure 6:
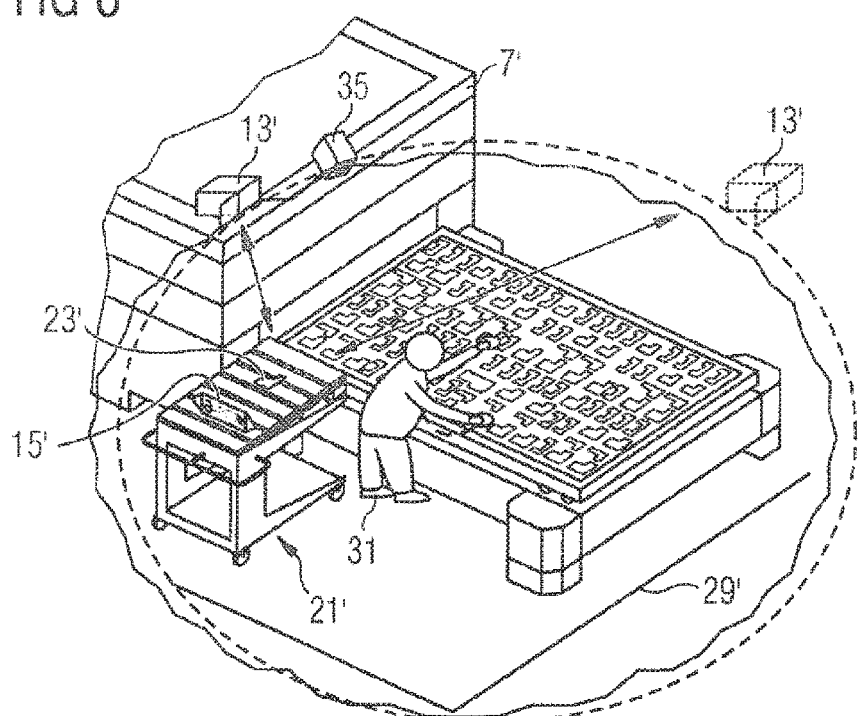
FIG. 6 shows an exemplary representation of a machine tool integrated into an indoor location system.

To illustrate, FIG. 6 shows a sorting process of an operator 31 that sorts/deposits the cut material of a laser cutting machine 7', which is output on a sorting table, on the transport carriage 21'. A mobile unit 15' was activated according to a specific order (processing plan assignment) and assigned to the workpieces 23' (spatial assignment). For example, after the sorting process has been completed, operator 31 has activated a key on the mobile unit 15' so that the manufacturing control system is informed that the sorting process was completed.

Thus, the operator of the machine tool to be used subsequently knows where in the manufacturing hall the workpieces are to be found (using the location information of the mobile unit). Once the operator has arrived at the location, which has been detected by means of a mobile unit carried by the operator and passing through a gate 29', and this has been forwarded to the manufacturing control system, and if multiple transport carriages are positioned closely together, the operator can identify the correct carriage by the manufacturing control system automatically activating an LED (signal emitting device) on the corresponding mobile unit so that it flashes, for example. This optical signal enables the operator to recognize the correct transport carriage and take it to his bending workstation. For example, the collection of the transport carriage is passed on to the manufacturing control system as soon as the operator collects the transport carriage 21' and pushes it over the gate 29'.

The indoor location system also allows the indexing of high storage areas in the stock. For example, a barometer of mobile units (3D tag) can be used to identify the height of the mobile unit and thus the "row" in a warehouse. The column of the warehouse can be identified by at least two transceiver units (2D localization). When mobile units are present in the storage body, the respective storage compartment for a pallet equipped with the mobile unit, for example, can be directly stored in the manufacturing control system. Accordingly, an operator can directly locate the pallet by the indication of the storage compartment. Alternatively, three or more transceiver units can be positioned in the high storage in such a way that it is also possible to determine the position in three-dimensional space.

Figure 7:
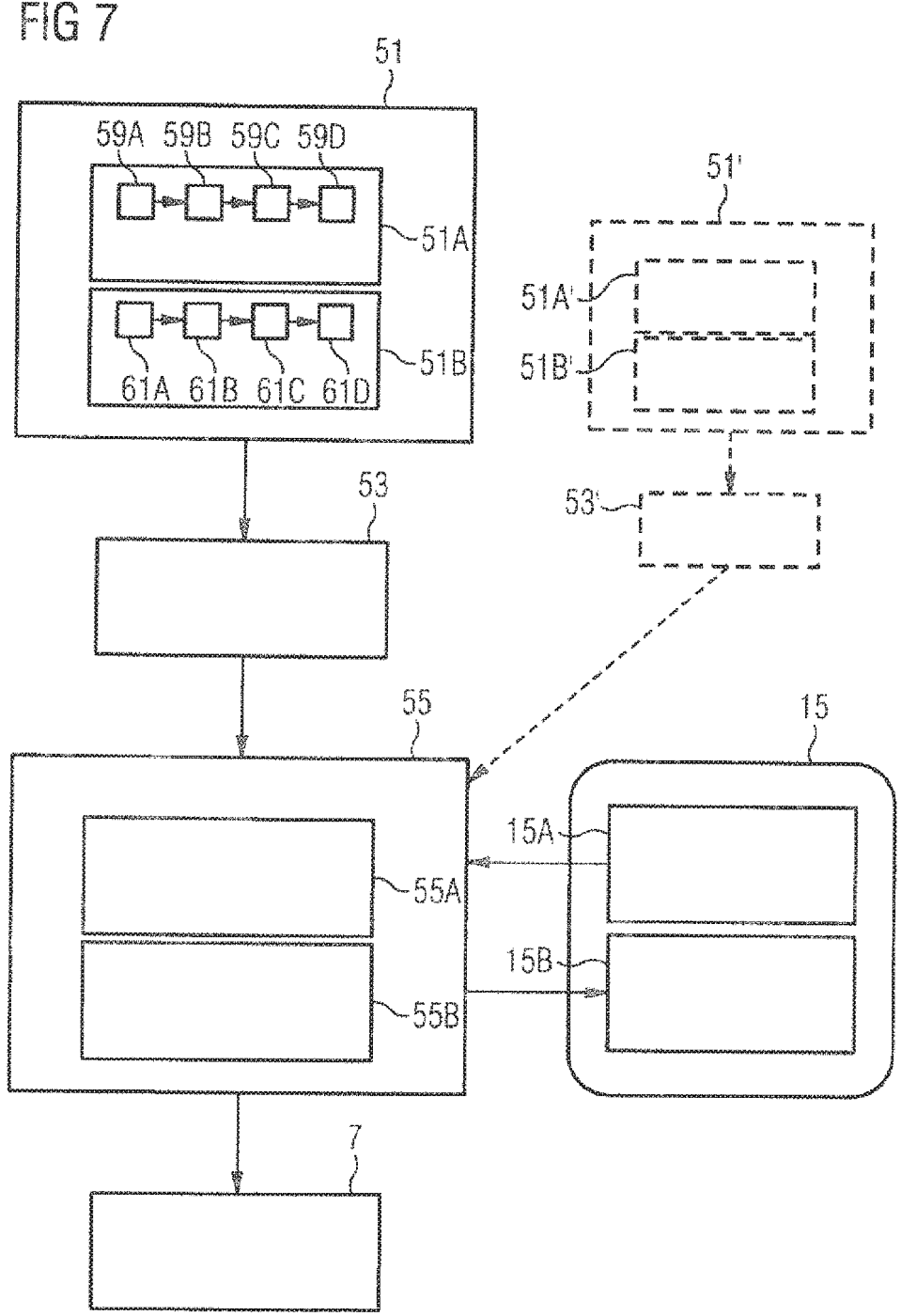
FIG. 7 shows a flow chart to illustrate a manufacturing process supported by an indoor location system.

The integration of the manufacturing process described herein, which is supported by an indoor location system, is explained in summary in connection with FIG. 7. In this context, additional reference is made inter alia to FIGS. 1 to 3 and 6.

FIG. 7 shows exemplary method steps of a method for the manufacturing control of process courses in the industrial processing of workpieces 23, whereby the method is supported by an indoor localization. Accordingly, an indoor localization as described above is provided for the method (step 51), and assignment operations are performed to map a mobile unit 15 to one or more workpieces 23. The assignment operations include a mobile unit data-assignment operation (step 51A)—that is, the digital assignment described above—and a spatial assignment operation (step 51B)—that is, the physical assignment described above.

The mobile unit data-assignment operation of step 51A is shown schematically in FIG. 1 in the manufacturing control system 1. Processing plans 37 are stored in the manufacturing control system 1. A processing plan 37 may include—as examples of a processing plan-assistance workpiece data set—a geometry data set 37A and/or a coding data set 37B identifying the workpiece. Furthermore, the processing plan 37 may include one or more processing and part parameters 37C of the corresponding part 23. Furthermore, the location system 5 provides mobile unit data sets 39, which are to be assigned to the processing plans 37.

For digital mapping, an image acquisition device 20, which is part of the mobile unit 15, for example, can be provided (step 59A). FIG. 2 shows schematically the image acquisition device 20 on the side wall of the mobile unit 15. The image acquisition device 20 can be used to acquire an image of a printout of an order letter with a code or a code 57 on the workpiece 23—as an example of a processing plan-specific object (step 59B). This image is then transmitted by a communication system from the mobile unit 15 to the manufacturing control system 1. In the manufacturing control system 1, the processing plan 37, which comprises a corresponding coding data set 37B, is identified (step 59C) and assigned to the mobile unit data set 39, which belongs, for example, to the mobile unit 15 with which the coding was imaged (step 59D).

Alternatively, this type of digital assignment can be carried out with any imaging device integrated into the manufacturing control system 1, in which case a mobile unit data set of any mobile unit can then be assigned to the identified processing plan.

The spatial assignment can be supported by an assistance system 41, which is provided for a machine tool 7 or generally at a workstation. FIG. 6 shows a machine tool 7 with an optical assistance system, which is based on image data acquisition with a camera 35 and supports the assignment of a workpiece to a mobile unit. For this, mobile units are provided to which processing plans have been assigned within the frame of a preceding digital assignment (step 51A).

In assisted spatial assignment, the camera 35 recognizes a sorted workpiece 23 (step 61A) and generates a measurement assistance workpiece-data set 41A (step 61B). The measuring assistance workpiece-data set 41A is compared with geometry data sets 37A of the processing plans 37 in the manufacturing control system 1 (step 61C) to identify the processing plan 37 that belongs to the detected workpiece. The manufacturing control system 1 can now, for example, stimulate the identified mobile unit to emit a signal (LED flashing, sound generation, . . . ); to facilitate manual spatial assignment. As an alternative or in addition, the manufacturing control system 1 can initiate to put down the detected workpiece 23 at the identified mobile unit 15 (step 61D) as part of an automated combination of the mobile unit 15 and the detected workpiece 23.

Once the assignment has been made, the position of the assigned workpiece 23 is determined by localizing the assigned mobile unit 15 with the indoor location system 5 (step 53).

The determined position of the mobile unit 15 is now integrated into the control system of the industrial manufacturing plant for the production of the end product (step 55). In addition or alternatively, a position of a tool, a person, a device of transport, a machine tool, and/or a workpiece collection point unit can be determined (steps 51', 51A', 51B', 53'), and integrated into the control of the industrial manufacturing plant.

The integration may, for example, include a definition (step 55A) of zones 27 and/or spatial gates 29 in the manufacturing hall, in particular in a site plan 25, 25' of the manufacturing hall, and a comparison (step 55B) of the determined position with respect to the zones 27 and/or the spatial gates 29.

In the site plan of the manufacturing hall, a zone (machine tool zone) can be created around machine tools/processing stations, for example, around the bending machine, in step 55A. This zone can be defined as a volume body (3D zone), which for example reaches up to a height of 1.5 m above the hall floor. If a transport carriage with workpieces and a respective mobile unit (carriage tag) with workpieces belonging to an order, is pushed into this zone, the manufacturing control system registers this in step 55B.

The support of the manufacturing control of process courses can include the integration of mobile units discussed herein. For example, an additional transmission of signals between the manufacturing control system 1 and the mobile unit 15 for the exchange of information can take place. The signals can be generated by a signal input device 15A of the mobile unit 15—e.g., a sensor, a key 19, or the image acquisition device 20—or by signal output devices 15B of the mobile unit 15—e.g., a display unit 17, an LED, or a loudspeaker.

Furthermore, the support of the manufacturing control of process courses via the manufacturing control system 1 can control processing parameters on the machine tools 7 or generally set manufacturing parameters, which can also relate to the manufacturing hall or to a subsequent data analysis, for example.

As a further example of an integration into the manufacturing control, the manufacturing control system can register the respective processing order at the processing station (e.g., on the bending machine) using the digital assignment of step 51A. Further secondary actions can also be initiated automatically. In this way a respective processing program can be automatically loaded in the machine tool. This can allow the machine tool (for example a bending machine) to be automatically set up via a Tool-Master. On an allocated screen, an operator can be shown information necessary for the upcoming machining process (work step). For example, an image of the original shape of the workpiece as well as the bent shape of the workpiece, the number of workpieces to be bent, and/or the subsequent machining process, etc. can be displayed.

An advantage when processing in connection with defined zones and gates is that the operator does not have to do anything more than to bring the workpieces, which were marked with the respective mobile unit, into the respective zone of a machine tool, which automatically initiates the various preparatory actions. As already mentioned, the machine tool can, for example, be immediately and automatically adjusted to the new order to be processed. This can save considerable time and errors can be avoided.

If the operator now starts to process the workpieces of the order (e.g., bending), he can take the mobile unit and attach it to active components of the machine tools, for example to the bending beam. There another zone (booking zone) is defined, which automatically takes the order into processing and passes this on to the manufacturing control system. For example, the bending processes performed can be monitored and saved for the order. Once all workpieces have been processed (bent), the mobile unit is removed from the booking zone, which means that the order can be booked in the manufacturing control system as fully executed, for example.

Using the mobile unit in a location system can also save considerable time here, as the operator does not have to make complicated bookings at a terminal.

When a mobile unit interacts with the manufacturing control system or when an operator activates additional functions (input keys, etc.) of a mobile unit, the operator can receive feedback or messages from the mobile units via output means such as RGB LED, vibration, displayed text or sound. For example, the status of a mobile unit or a respective order can be visualized, for example by having an LED light up green as long as the order is in the processing state. Furthermore, feedback or a message can be given to subsequent processing stations. For example, the automatic booking of a completed processing procedure can alert the subsequent process that the parts are now ready and where they are located. In general, triggering actions such as booking via zones can be further enhanced, so that, for example, workpieces can be monitored over time during the various processing procedures.

If, in addition to the spatial position, the orientation in space of a mobile unit is measured, a distinction can be made, for example, as to whether a specific mobile unit lies horizontally or on its edge. This allows further interaction with the manufacturing control system. For example, a carriage with workpieces from multiple orders (i.e., multiple different workpieces to be processed differently, for example) and multiple mobile units can be pushed into one zone. If not all orders are to be processed at the same time, information on a specific order that is to be processed first, for example, can be given to the manufacturing control system can by a vertical position of the corresponding mobile unit.

Another possibility to give feedback to the manufacturing control system via the mobile unit is the already mentioned shaking of the mobile unit or the execution of specific gesture-like movements.

It is also possible to trigger events or display upcoming events based on the number of mobile units (for example currently active and/or inactive mobile units) located in one or more zones. For example, picking processes or transfer tasks can be triggered.

In addition to stationary zones, zones can also move dynamically with one or more mobile units. This allows, for example, the transport of multiple load carriers (transport carriages), and the orders carried along can be treated together as a cluster by the manufacturing control system.

In addition, a mobile unit can be assigned (spatial assignment) to a hand tool (tool tag), for example, and digitally assigned with respect to the workpiece itself so that this can be located easier. In addition, one can detect with an acceleration sensor provided within such a tool tag when and/or how a hand tool is used.

By determining the position of the tool, it is also possible to measure the movement of the tool through space (trajectory information/evaluation). This can be used to generate information on how many components were processed or whether a processing step was forgotten, etc.

Furthermore, further data can be transmitted via the location system, for example error messages by corresponding movement patterns of a mobile unit, e.g., in a defined error zone.

Another usage scenario concerns the recording of process states that are characterized by the positions of workpieces, people, machines, and other operating resources and that can be captured by a cognitive evaluation of these measured positions. In general, the location data and the sensor data as well as the information regarding zones and gates allow a variety of evaluation possibilities. For example, it is possible to use such raw data to generate key performance indicators (KPIs) and to carry out detailed analyses to optimize manufacturing processes. These analyses (e.g., KPIs) can be presented in the form of "heat maps", as a live view or aggregated. Further evaluation diagrams such as spaghetti diagrams are thus immediately available for various processing operations. This makes it possible to make standard key figures, which often generate a great deal of effort during collection, available at the push of a button, such as lead time, value stream analysis, etc. In addition, the courses of the production can be improved on the basis of the location information obtained with the aid of numerical optimization methods.

The use of the location system also allows to localize persons if they carry a mobile unit (person tag). In addition to workpieces and tools, the localization of persons (as a whole or local localization of leg, arm and hand) provides valuable information about the courses of the production. Usage scenarios for this purpose concern, for example, the monitoring of safety-critical areas for the protection of persons, in particular the operators. Furthermore, movement patterns can be generated, which in turn can be evaluated e.g., for process or ergonomic improvement of workstations of the operators. In particular, the synchronous evaluation of both hands of a person, especially an operator or a worker, can provide detailed information about the manufacturing process and the workpiece. It can be recorded in this way that a worker has grasped at a position X;

a worker has transported a specific workpiece from A to B;

a worker has placed a specific workpiece at a position Y;

a manufacturing process such as drilling, press-fitting, . . . has been carried out x times;

a manufacturing process such as deburring, welding, . . . has been carried out on a specific trajectory on a workpiece;

a joining process was carried out at a specific position.

Different mobile units can have specific relationships to each other. For example, such mobile units can be grouped into families of mobile units as part of a specific manufacturing process in order to define basic (behavioral) patterns for a specific number of mobile units. Families can, for example, be assigned to an order, an assembly, a subsequent process of workpieces, or a respective load carrier (transport carriage, pallet, collection container). The family relation can be changed dynamically during the current course of processing. Mobile units can belong to different families at the same time. Furthermore, families of mobile units can have a specific link, for example, all load carriers, all means of transport, all workers, all workpieces, all machines, etc., or a family of mobile units can relate to a specific status of the mobile unit, for example, a charging status of mobile units.

Accordingly, the analysis, like the recording of process states, can be based on the evaluation of such families of mobile units.

The herein disclosed extension of a manufacturing plant with an indoor localization and interfaces to the manufacturing control system can be used to determine the position of the workpiece collection point units and/or to record the movement of an operator's hand. Such a localization using an ultra-wideband system can be built up from four or more "anchors" and one or more "tags". The anchors serve as receivers and can be positioned stationary around the working area. The tags are attached to, for example, all workpiece collection point units and, for example, the operator's hand, and are used to determine the position of the same. Other indoor location systems include, for example, Bluetooth, WiFi, infrared, and RFID.

If the workpiece collection point unit is integrated into a location system, a corresponding system in the machine tool hall, where multiple processing machines and/or workstations are provided, can be used to enable a localization via transmitter-receiver systems.

An operator who monitors and controls the course of the processing in a control center can see on his surveillance monitor where a specific order is currently in the process chain and what its status is at the moment. Accordingly, he can also directly access the display unit to adjust displayed data (workpiece information) such as preferences, processing steps, etc. Alternatively or in addition, this can also be done on site with an input device on the workpiece collection point unit (e.g., button, switch, touchpad) or via a data interface that gives an external e.g., mobile input unit (Smartphone, Ipad, Smartwatch etc.) access. Accordingly, the workpiece collection point unit has a near-field radio network (Bluetooth, NFC), for example. This can also be used, for example, as part of a near-field location system to locate the workpiece collection unit. The latter makes it easier to find a workpiece collection point unit, for example, if it is hidden in a large number of workpiece collection point units. For example, the workpiece collection point unit is specifically controlled to activate the signal device (e.g., a brightly lit LED).

The near field localization can also be used, for example, for sorting, for example, when the location of a hand (especially an intelligent glove that interacts with the location system) is located by the workpiece collection unit. If the "hand" of an operator removes a component from the remaining grid, the component location is booked from the remaining grid to the hand in the MES. If the hand moves near a location system of the workpiece collection point unit, the MES records that this part has been deposited at the corresponding workpiece collection point unit. On the one side, the location system can detect that the hand came close to the workpiece. On the other side, a higher-level system (e.g., the MES) can link the workpiece collection point unit and the position of the hand.

Figure 8:
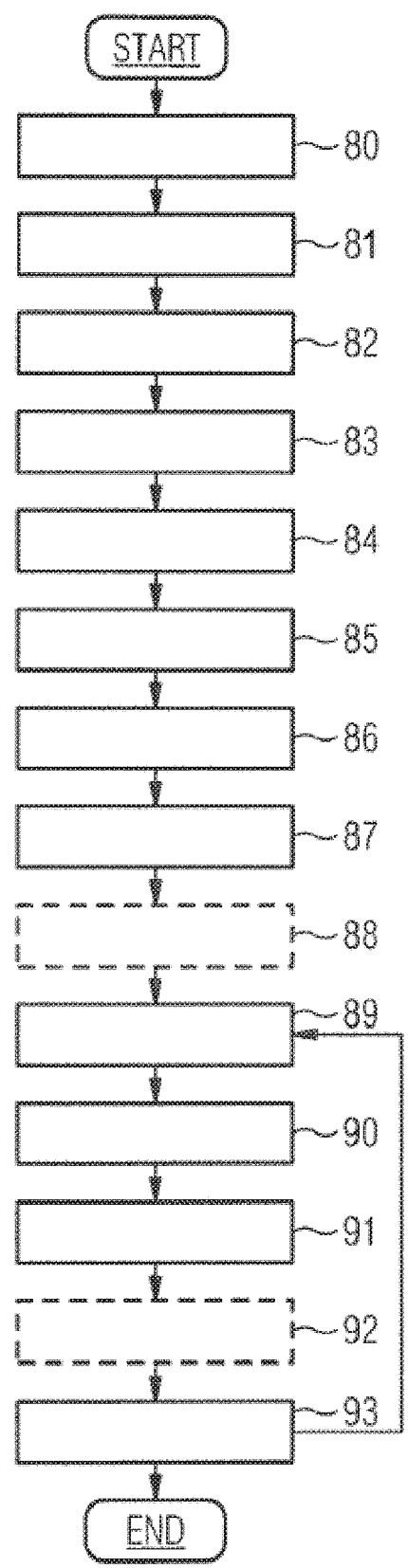
FIG. 8 shows a flow chart to illustrate method steps for the industrial manufacturing of an end product.

FIG. 8 shows exemplary method steps of an industrial manufacturing of an end product, which can be carried out with a manufacturing control system, in particular the MES 3.

In a first step 80, a manufacturing order (with a processing plan 37) is received to manufacture an end product from a workpiece 23 with the MES 3, which is implemented in a data processing device 30A, for example. In a subsequent step 81, individual processing steps are selected by the MES 3. In a further step 82, a sequence is selected by the MES 3 (or an operator) in which the processing steps are to be carried out. The processing steps may be one or more of the following: cutting, in particular laser cutting, punching, bending, drilling, threading, grinding, joining, welding, riveting, screwing, pressing, treating the edges and surfaces.

In a further step 83, each of the processing steps is data-technically assigned to a machine 7 or a workstation unit. The workstation unit can be a workstation 26 as described above, especially a manual workstation.

In a further step 84, the manufacturing order is data-technically assigned to a mobile unit data set 39, which is stored in MES 3 for a mobile unit. This step 84 can correspond to step 51A shown in FIG. 7. In particular, step 84 may be carried out earlier, e.g., after one or more of the method steps described above.

In a further step 85, a workpiece 23, which is at least partially a part of the end product, is manufactured, in particular after a first of the processing steps on the machine 7 or workstation unit assigned to this processing step. For example, a part of the manufacturing order is cut from a sheet metal. As milling or punching may also be necessary as a subsequent processing step, this workpiece 23 may include even more material than the end product, e.g., it may only partially form the end product or be a part of it.

In a further step 86, the spatial assignment of the mobile unit assigned to the manufacturing order to the manufactured workpiece 23 is done. This step 86 can correspond to step 51B shown in FIG. 7. In a further step 87, a change in the status of the manufacturing order is saved in MES 3.

In an optional step 88, the position of the mobile unit 15 is saved with respect to the manufacturing order.

In a further step 89, the workpiece 23 together with the mobile unit 15 is transported according to the manufacturing order to the next machine 7 or the next workstation unit in the predetermined sequence. This can be done as a result of an instruction of the MES 3 by a person or by an automated transport process.

In a further step 90, this processing step is performed at the machine 7 or workstation unit assigned to it.

In an optional step 91, the position of the mobile unit 15 for this processing step is saved in the manufacturing order.

In a further step 92, a change in the status of the manufacturing order is saved again in MES 3.

In a further step 93, a decision is made as to whether to continue with method step 89, i.e., a transport to a further processing step, or whether the manufacturing is completed.

During these processing steps, a localization of the mobile unit 15 with the location system 5 on the basis of electromagnetic signals can always be controlled via the MES 3. This allows the MES 3 to have data such as current status and current position data of the workpiece 23 at any time. MES 3, mobile unit 15, and the location system 5 can be configured in particular as described above.

All the above described method steps, which are carried out by a manufacturing control, a manufacturing control system, a location system, or by the MES 3, may also be implemented by means of one or more data processing devices having means for carrying out the method steps.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A method of assigning workpieces to be processed to mobile transceivers of an indoor location system used in a manufacturing hall, the method comprising:
   providing a manufacturing control system for industrial processing of workpieces with a machine tool according to workpiece-specific processing plans, wherein order information of the workpieces is defined respectively in the workpiece-specific processing plans and includes at least one of processing parameters, workpiece parameters, or at least one processing plan-assistance-workpiece data set;
   providing an assistance system adapted to acquire measurement-assistance-workpiece data sets for the workpieces;
   detecting a workpiece to be assigned with the assistance system and generating a measurement-assistance-workpiece data set for the workpiece;

identifying a processing plan associated with the workpiece by comparing the measurement-assistance-workpiece data set generated for the workpiece with a processing plan-assistance-workpiece data set corresponding to the workpiece;

providing at least one mobile transceiver assigned to the identified processing plan, wherein the indoor location system is configured to determine a position of the mobile transceiver; and spatially assigning the workpiece to the mobile transceiver assigned to the identified processing plan.

2. The method of claim 1, wherein the processing plan-assistance-workpiece data set corresponding to the workpiece comprises at least one of an image data set of the workpiece, or a coding data set incorporated into the workpiece, and wherein the assistance system is configured to perform at least one of:

detecting image data of the workpiece for generating the image data set for the workpiece, or detecting a coding for generating the coding data set for the workpiece.

3. The method of claim 2, wherein the coding data set comprises at least one of:

an RFID data set, a bar coding data set, or a magnetic coding data set.

4. The method of claim 1, wherein the assistance system is configured to acquire the measurement-assistance-workpiece data set for the workpiece.

5. The method of claim 1, wherein the assistance system is arranged on the machine tool and configured to detect the measurement-assistance-workpiece data sets for workpieces that are output from the machine tool and intended for further processing.

6. The method of claim 1, wherein the machine tool is configured to:

receive the workpiece, and deposit the workpiece in a depositing area assigned to the mobile transceiver.

7. The method of claim 1, wherein the machine tool is configured to:

receive the mobile transceiver and the workpiece, and deposit the mobile transceiver and the workpiece at a workpiece collection point.

8. The method of claim 1, wherein the assistance system is configured to assist a sorting process of workpieces arranged spatially adjacent to each other on a sorting table, wherein the assistance system includes a camera for imaging the sorting table and for generating a measurement-assistance-workpiece data set for at least one of the workpieces from a plurality of sorting image data sets, and wherein the processing plan-assistance-workpiece data set comprises a processing plan-image data set on which manufacturing of the workpieces arranged spatially adjacent to each other is based.

9. The method of claim 8, wherein workpieces to be assigned are generated with a flatbed machine tool according to the workpiece-specific processing plans and fed to the sorting table.

10. The method of claim 1, wherein the manufacturing control system is configured to provide the mobile transceiver with a workpiece parameter for outputting information about the workpiece assigned to the mobile transceiver to support a manual operation of the spatially assigning the workpiece to the mobile transceiver.

11. The method of claim 1, wherein the manufacturing control system is configured to control the mobile transceiver such that at least one of a processing parameter or a workpiece parameter is displayed on a display of the mobile transceiver.

12. The method of claim 1, wherein the manufacturing control system is configured to assign a mobile transceiver data set of the mobile transceiver to the identified processing plan, wherein the method comprises a mobile transceiver data-assignment process including at least one of:

a positioning of the mobile transceiver, a shaking of the mobile transceiver, or both, in a geometrically defined zone in the manufacturing hall, an interacting with the manufacturing control system via a user interface, an input of a reference number belonging to the identified processing plan into the manufacturing control system, an automated or partially automated activation of the mobile transceiver via at least one sensor of the mobile transceiver having at least one of an input key on the mobile transceiver, an acceleration sensor, a position sensor, or a sound sensor, or a linking of the mobile transceiver data set with a default object in the manufacturing control system.

13. The method of claim 12, comprising:

in the mobile transceiver data-assignment process, loading at least part of the order information onto the mobile transceiver.

14. The method of claim 1, wherein the assistance system has access to processing plan-assistance-workpiece data sets of the manufacturing control system, and wherein comparing the measurement-assistance-workpiece data set generated for the workpiece to be assigned with the processing plan-assistance-workpiece data set corresponding to the workpiece to be assigned is performed by the assistance system.

15. The method of claim 1, comprising:

assigning at least one tool or a workpiece collector to another mobile transceiver of the indoor location system based on comparing a measurement-assistance-tool data set for the tool or the workpiece collector with a processing plan-assistance-tool data set corresponding to the tool or the workpiece collector.

16. A manufacturing control system for controlling manufacturing processes of workpieces in a manufacturing hall, the manufacturing control system comprising:

an indoor location system configured to support manufacturing control of the manufacturing processes, the indoor location system comprising:

at least one stationary transceiver permanently installed in the manufacturing hall, at least one mobile transceiver, and wherein the stationary transceiver and the mobile transceiver are configured for transmitting and receiving electromagnetic signals, wherein the indoor location system is configured to:

determine runtimes of the electromagnetic signals between the stationary transceiver and the mobile transceiver, determine a position of the mobile transceiver in the manufacturing hall from the runtimes of the electromagnetic signals, and exchange and provide data on the position of the mobile transceiver in the manufacturing hall; and a manufacturing execution system (MES) configured to:

provide the manufacturing control system with a machine tool according to workpiece-specific processing plans, wherein order information of the workpieces is defined respectively in the workpiece-specific processing plans and includes at least one of processing parameters, workpiece parameters, or at least one processing plan-assistance-workpiece data set, provide an assistance system adapted to acquire measurement-assistance-workpiece data sets for the workpieces, detect a workpiece to be assigned with the assistance system and generate a measurement-assistance-workpiece data set for the workpiece to be assigned, identify a processing plan associated with the workpiece by comparing the measurement-assistance-workpiece data set for the workpiece with a processing plan-assistance-workpiece data set corresponding to the workpiece, provide the mobile transceiver assigned to the identified processing plan, and spatially assign the workpiece to the mobile transceiver assigned to the identified processing plan.

17. A method of industrial manufacturing of an end product using a manufacturing control system, the method comprising:

receiving a manufacturing order for manufacturing the end product from a workpiece with a manufacturing execution system (MES) of the manufacturing control system;

selecting individual processing steps with the MES;

determining an order of the processing steps with the MES, wherein the processing steps include two or more operations from a group of operations consisting of: cutting, punching, bending, drilling, threading, grinding, joining, welding, riveting, screwing, pressing, and treating the edges and surfaces;

assigning the processing steps to one or more machines or workstations;

assigning the manufacturing order to a mobile transceiver data set in the MES;

manufacturing the workpiece for the end product into a part of the end product after a first processing step of the processing steps on a first machine or workstation assigned to the first processing step;

spatially assigning a mobile transceiver assigned to the manufacturing order to the manufactured workpiece, the mobile transceiver being in a location system of the manufacturing control system;

storing a status change of the manufacturing order in the MES;

transporting the manufactured workpiece together with the mobile transceiver, according to the manufacturing order to a second machine or workstation in a predetermined sequence;

performing a second processing step of the processing steps on the second machine or workstation;

storing a second status change of the manufacturing order in the MES; and performing remaining processing steps of the processing steps of the manufacturing order with the MES in the predetermined sequence, wherein the MES is configured to determine a position of the mobile transceiver with the location system of the manufacturing control system and obtain data on a current status and a current position of the manufactured workpiece.

18. The method of claim 17, comprising:

providing the manufacturing control system with a machine tool according to workpiece-specific processing plans, wherein order information of workpieces is defined respectively in the workpiece-specific processing plans and includes at least one of processing parameters, workpiece parameters, or at least one processing plan-assistance-workpiece data set, providing an assistance system adapted to acquire measurement-assistance-workpiece data sets for the workpieces, detecting the manufactured workpiece with the assistance system and generating a measurement-assistance-workpiece data set for the manufactured workpiece, identifying a processing plan associated with the manufactured workpiece by comparing the measurement-assistance-workpiece data set for the manufactured workpiece with a processing plan-assistance-workpiece data set corresponding to the manufactured workpiece, providing the mobile transceiver assigned to the identified processing plan, and spatially assigning the manufactured workpiece to the mobile transceiver assigned to the identified processing plan.

* * * * *